United States Patent
Hardesty et al.

(10) Patent No.: US 11,156,371 B2
(45) Date of Patent: Oct. 26, 2021

(54) NETWORKED BOILERS AND CONTROL METHOD

(71) Applicant: The Marley Company LLC, Burr Ridge, IL (US)

(72) Inventors: Ryan Jeremy Hardesty, Valparaiso, IN (US); Daniel George Karch, La Porte, IN (US); David Ralston King, Trail Creek, IN (US); Owen Andrew Cunningham, Michigan City, IN (US); Neil Damon Butt, New Carlisle, IN (US); Aaron Sevrin Smith, Chicago, IL (US); Jeffrey John Calabro, Michigan City, IN (US)

(73) Assignee: The Marley Company LLC, Burr Ridge, IL (US)

( * ) Notice: Subject to any disclaimer, the term of this patent is extended or adjusted under 35 U.S.C. 154(b) by 117 days.

(21) Appl. No.: 15/222,206

(22) Filed: Jul. 28, 2016

(65) Prior Publication Data

US 2017/0211821 A1  Jul. 27, 2017

Related U.S. Application Data

(60) Provisional application No. 62/286,199, filed on Jan. 22, 2016, provisional application No. 62/286,205, filed on Jan. 22, 2016.

(51) Int. Cl.
| | | |
|---|---|---|
| *F24D 19/10* | (2006.01) | |
| *F24D 12/02* | (2006.01) | |
| *F22D 5/32* | (2006.01) | |
| *F24D 3/08* | (2006.01) | |
| *F22D 5/24* | (2006.01) | |
| *F22D 5/34* | (2006.01) | |

(52) U.S. Cl.
CPC .......... *F24D 19/1066* (2013.01); *F22D 5/32* (2013.01); *F22D 5/34* (2013.01); *F24D 3/082* (2013.01); *F24D 12/02* (2013.01); *Y02B 30/00* (2013.01); *Y02E 20/14* (2013.01)

(58) Field of Classification Search
CPC ... F22D 5/34; F22D 5/32; F24D 3/082; F24D 19/1066; F24D 12/02; F24D 3/02; F24D 3/08; Y02B 30/14
See application file for complete search history.

(56) References Cited

U.S. PATENT DOCUMENTS

| | | | | |
|---|---|---|---|---|
| 5,622,221 A | * | 4/1997 | Genga, Jr. | F24D 19/1012 165/208 |
| 5,779,143 A | * | 7/1998 | Michaud | F24D 19/1009 237/56 |
| 5,831,345 A | * | 11/1998 | Michaud | H02J 1/14 307/38 |
| 2009/0064944 A1 | * | 3/2009 | Paine | F24H 9/2035 122/14.22 |

(Continued)

*Primary Examiner* — Steven S Anderson, II
(74) *Attorney, Agent, or Firm* — BakerHostetler

(57) ABSTRACT

A hydronic system having a set of inputs, a plurality of boilers, and a controller. Each input representing sensor for a respective heat emitter of a set of heat emitters. Each boiler of the plurality of boilers is configured to receive signals from a portion of the set of inputs. The controller is configured to a status and assignment of the set of inputs from the plurality of boilers and control the plurality of boilers to provide heat to the set of heat emitters.

11 Claims, 12 Drawing Sheets

(56) References Cited

U.S. PATENT DOCUMENTS

| | | | |
|---|---|---|---|
| 2010/0232877 A1* | 9/2010 | Sanvik | E02D 3/11 404/77 |
| 2012/0191256 A1* | 7/2012 | Deivasigamani | F24D 17/0026 700/276 |
| 2014/0272049 A1* | 9/2014 | Azzano | A47J 31/4403 426/433 |
| 2015/0369494 A1* | 12/2015 | Skovmose Kallesoe | F24D 19/1006 165/247 |
| 2016/0161148 A1* | 6/2016 | Honeycutt | F24D 19/1021 122/14.3 |
| 2016/0187894 A1* | 6/2016 | Malky | F24D 3/02 700/276 |
| 2017/0030593 A1* | 2/2017 | O'Connor | F24D 3/02 |

\* cited by examiner

NETWORKED BOILERS AND CONTROL METHOD

CROSS-REFERENCE TO RELATED APPLICATIONS

This application claims priority to U.S. provisional patent application entitled "NETWORKED BOILERS AND CONTROL METHOD", filed Jan. 22, 2016, having Ser. No. 62/286,199, and U.S. provisional patent application entitled "BOILER AND CONTROL METHOD", filed Jan. 22, 2016, having Ser. No. 62/286,205, the disclosures of which are hereby incorporated by reference in their entireties.

FIELD OF THE INVENTION

This invention relates generally to a network of boilers. More particularly, the present invention relates, for example, to a network of boilers and method of controlling the network.

BACKGROUND OF THE INVENTION

Boilers are used to generate heat for various applications such as domestic hot water and building heat. For installations with large variations in the heat demand, it may be more economical to have multiple boilers that can turn on and off as needed. There is a trend in the boiler industry is to install several smaller boilers in place of a single large boiler. This provides several benefits including ease of installation, redundancy during a single boiler failure, simultaneous operation for different uses (heating and domestic hot water "DHW"), as well as an overall greater system turndown ratio (the ability of a boiler or a system to modulate its power output to match the current heat loss of the building).

An additional long time trend in the hydronic industry is to take advantage of the ability to zone a building into different areas of desired temperature control and/or types of heat emitters (baseboard, radiant tubing, fan coils, etc.). These two trends create a compounding complex problem that often requires additional controls to be added such as: Multiple boiler sequencing controls—used to operate the correct number of boilers at the correct power output (if modulating or multi-stage) in order to achieve the desired water temperature in the piping system. They are also often used to rotate the boilers in operation to achieve equal runtimes on the equipment and/or provide the combination of boilers the installer feels provides the best efficiency; and Zone Controls—these ancillary controls are used to respond to the thermostats in the separate areas of the building by managing the proper circulating pumps and/or valves and interacting with the boilers (or other heating or cooling equipment). The two main methods of sending water to only those zones that require heat are either opening/closing valves or turning circulating pumps on or off.

While conventional boilers may be networked together using an external relay panel, some functionality may be lost. Accordingly, there is a need in the art to improve networked boilers.

SUMMARY OF THE INVENTION

The foregoing needs are met, to a great extent, by the present invention, wherein aspects of a networked of boilers is provided.

An aspect of the disclosure pertains to A control system for an appliance comprising: a controller; a first circuit for using hot-water provided by the appliance; the first pump system configured to pump hot-water provided by the appliance through the first circuit; a first valving assembly configured to selectively provide hot water to the first circuit; a first sensor configured to send a signal to the controller associated with a demand for hot water in the first circuit; a second circuit for using hot water provided by the appliance; a second pump system configured to pump hot-water provided by the appliance through the first circuit; a second valving assembly configured to selectively provide hot water to the second circuit; a second sensor configured to send a signal to the controller associated with a demand for hot-water in the second circuit; and a communication system configured to operatively connect the controller to the first pump system, the first valving assembly, the first sensor, the second pump system, and the second valving assembly, and the second sensor, wherein the controller is configured to prioritize which circuit to send hot-water to win receiving signals from both the first and second sensor requesting hot-water and control the appliance to provide hot water at either a first or second temperature. The control system, further comprising a burner element associated with the appliance operatively connected to the controller and configured to be controlled by the controller for providing hot water at either the first or second temperature. The control system, wherein the appliance is a boiler. The control system, wherein the communication system is either a wireless communication system, or a wired communication system. The control system, where in the controller operates the various circuits under a zone control regime. The control system, wherein the controller operates the various circuits under a priority control regime. The control system, wherein one of the circuits is configured to provide domestic hot water. The control system, further comprising an additional circuit for using hot-water provided by the appliance wherein the additional circuit includes an additional pump system configured to pump hot-water provided by the appliance through the additional circuit; an additional valving assembly configured to selectively provide hot water to the additional circuit; and an additional sensor configured to send a signal to the controller associated with the demand for hot water and the additional circuit. The control system, wherein the appliance is configured to provide hot water at least three different temperatures. The control system, wherein the controller is programmable to allow a user to set the hot water temperatures the appliance can provide. The control system, wherein the controller is configured to operate the valve assemblies and pumps to provide a desired water flow.

Another aspect of the disclosure relates to A method of operating an appliance comprising: receiving a first signal from a first remote sensor; processing the signal to determine a need for hot water for a first circuit; receiving a second signal from a second remote sensor; and processing the signal to determine a need for not water for a second circuit, wherein the signals may either be calls for hot water at the same temperature or signals for hot water at different temperatures. The method, wherein the first sensor is a temperature sensor and the second sensor is a thermostat. The method, wherein one of the circuits provides domestic hot water. The method, further comprising modulating a burner to provide water a temperature requested by one of the signals. The method, further comprising controlling some circuits in a zone control regime and controlling some circuits under a priority control regime. The method, further comprising assigning priority to the circuits. The method, further comprising operatively connecting the appliance to other appliances. The method, further comprising providing hot water at 190 degrees F., 160 degrees F. and 120 degrees F.

Yet another aspect of the disclosure pertains to A control system for an appliance comprising: a means for controlling the appliance; a first circuit for using hot-water provided by the appliance; the first pump system configured to pump hot-water provided by the appliance through the first circuit; a first valving assembly configured to selectively provide hot water to the first circuit; a first sensor configured to send a signal to the controller associated with a demand for hot water in the first circuit; a second circuit for using hot water provided by the appliance; a second pump system configured to pump hot-water provided by the appliance through the first circuit; a second valving assembly configured to selectively provide hot water to the second circuit; a second sensor configured to send a signal to the controller associated with a demand for hot-water in the second circuit; and a communication system configured to operatively connect the controller to the first pump system, the first valving assembly, the first sensor, the second pump system, and the second valving assembly, and the second sensor, wherein the controller is configured to prioritize which circuit to send hot-water to win receiving signals from both the first and second sensor requesting hot-water and control the appliance to provide hot water at either a first or second temperature.

Yet another aspect of the disclosure pertains to a hydronic system, comprising: a set of inputs, each input representing sensor for a respective heat emitter of a set of heat emitters; a plurality of boilers with each boiler of the plurality of boilers being configured to receive signals from a portion of the set of inputs; and a controller configured to a status and assignment of the set of inputs from the plurality of boilers and control the plurality of boilers to provide heat to the set of heat emitters.

Yet another aspect of the disclosure pertains to a hydronic system, comprising: a set of inputs, each input representing sensor for a respective heat emitter of a set of heat emitters; a plurality of boilers with each boiler of the plurality of boilers being configured to receive signals from a portion of the set of inputs; and a controller configured to a status and assignment of the set of inputs from the plurality of boilers and control the plurality of boilers to provide heat to the set of heat emitters, wherein the controller individually controls a firing order of the plurality of boilers based on a predetermined sequence.

Yet another aspect of the disclosure pertains to A hydronic system, comprising: a set of inputs, each input representing sensor for a respective heat emitter of a set of heat emitters; a plurality of boilers with each boiler of the plurality of boilers being configured to receive signals from a portion of the set of inputs; and a controller configured to a status and assignment of the set of inputs from the plurality of boilers and control the plurality of boilers to provide heat to the set of heat emitters, wherein the controller individually controls a firing order of the plurality of boilers based on a predetermined sequence and wherein the controller is configured to modify the predetermined sequence based on a respective status of a boiler of the plurality of boilers.

Yet another aspect of the disclosure pertains to a hydronic system, comprising: a set of inputs, each input representing sensor for a respective heat emitter of a set of heat emitters; a plurality of boilers with each boiler of the plurality of boilers being configured to receive signals from a portion of the set of inputs; and a controller configured to a status and assignment of the set of inputs from the plurality of boilers and control the plurality of boilers to provide heat to the set of heat emitters, wherein the controller individually controls a firing order of the plurality of boilers based on a predetermined sequence and wherein the controller is configured to modify the predetermined sequence based on a local demand being serviced by a respective status of a boiler of the plurality of boilers.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

In accordance with another embodiment of the present disclosure, a hot water supply system for uses such as heating, domestic hot water or other uses may be flexible to allow a boiler or other appliance control several zones receiving water of the same temperature or groups of circuits receiving water at different temperatures. The zones and/or priorities may also be referred to as circuits. For the purpose of this document, controlling several circuits receiving water of the same temperature may be referred to as zone control and control of groups of circuits receiving water at different temperatures may be referred to as priority control. Circuits receiving hot water of the same temperature may be referred to as zones and circuits receiving hot water at different temperatures may be referred to as priorities.

In accordance with the present disclosure, a controller may be allowed to control an appliance to have the flexibility to perform either zone control or priority control or a combination of zone control and priority control in sending hot water to various zones and/or prioritys on different hot water circuits. Example systems 200 are illustrated in FIGS. 1 and 2.

Figure 1:
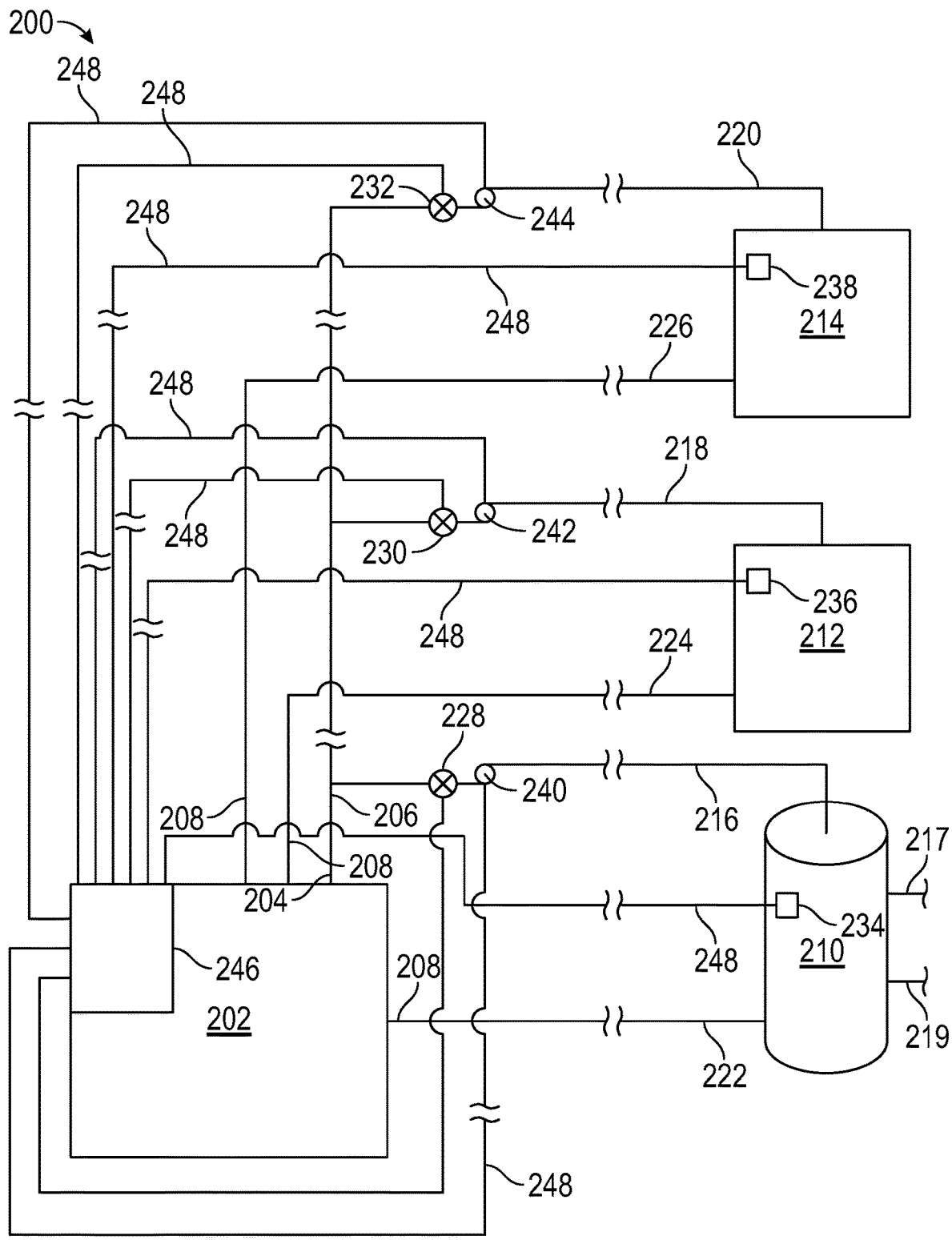
FIG. 1 is a diagram of a hydronic system according to an aspect of the disclosure.
Figure 2:
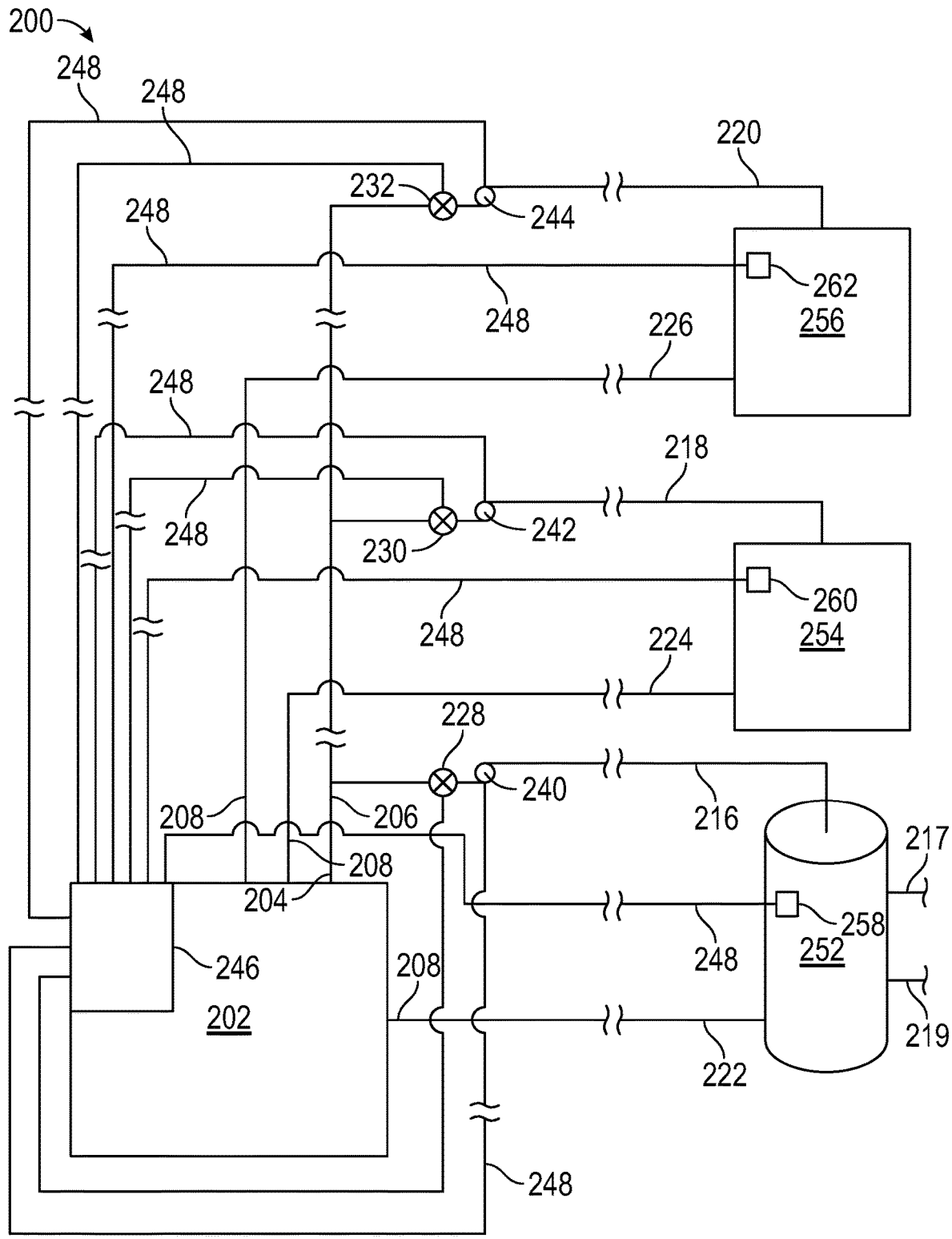
FIG. 2 is a diagram of a hydronic system according to an aspect of the disclosure.

As shown in FIGS. 1 and 2, a system 200 may include a boiler 202, hot water boiler, or other appliance 202 configured to provide hot water. While the term boiler 202 may be used herein, it should be understood that this term is not meant to be limiting, but can be used to refer to any appliance 202 controlled and operated as part of a system 200 such as described herein.

The appliance 202 may have a hot water output 204. The hot water output 204 supplies hot water via a supply pipe 206. The appliance 202 may also include water inputs 208 which are configured to receive water either from a water supply system such as a well, municipal water supply system or other water supply system or it can also receive water returning from various heating circuits, priorities or zones.

In the example embodiment shown in FIG. 1, a first zone 210 and a second zone 212 are shown. Additional zones are represented by zone n 214. It should be understood that the character "n" may be used to represent any number of additional zones that may be part of the system 200 and that the amount of zones in the system 200 is not limited to three only. It should further be understood that some systems 200 may include only one or two zones.

Each zone 210, 212, 214 may be a circuit which uses hot water received from the appliance 202. For example any of the zones 210, 212, and 214 may represent for example a radiant tubing zone, baseboard heating zone, a heat exchanger used for providing domestic hot water (DHW) as illustrated by zone 212, or any other circuit that uses hot water. Each zone 210, 212, 214 may include a supply conduit 216, 218, and 220. In instances where the zone may include a heat exchanger providing domestic hot water, a cold water inlet 217 and hot-water outlet 219 may also be attached to the heat exchanger but this water does not generally mix with water provided by the appliance 202. It is only heated by water provided by the hot water from the appliance 202. In other embodiments, water provided by the appliance 202 may be directly used for domestic hot water.

Each zone 210, 212, 214 may further include cold water return conduits 222, 224, and 226 which are configured to return cold water back to the appliance 202 for reheating. Each zone 210, 212, 214 may include valve systems 228, 230, and 232 which are configured to control the input and/or output of water into each zone 210, 212, 214. Each zone, 210, 212, 214 may also include temperature sensors 234, 236, 238 which are configured to sense a temperature of hot water within each zone 210, 212, 214. Each zone, 210, 212, 214 may also include pumps 240, 242, 244, which are configured to circulate water through each respective zone 210, 212, 214.

FIG. 2 differs from FIG. 1 in that rather than using zones 210, 212, 214, priorities, circuit 1 252, circuit 2 254, and circuit n 256, are used to denote hot water circuits that may require hot water at different temperatures from each other. The various priorities 252, 254, and 256 incorporate the use of thermostats 258, 260, thermostat n 262 rather than the temperature sensors 234, 236, sensor n 238 as shown in FIG. 1. Aquastats may be used in place, or in addition to thermostats.

In the systems 200 of FIGS. 1 and 2, the valves 228, 230, n 232, are operatively connected to the controller 246 via connectors 248. Furthermore the pumps 240, 242, pump n 244, are also operatively connected to the controller 246 via the connectors 248. The temperature sensors 234, 236, 238 of the zones 210, 212, and 214, are operatively connected to the controller 246 via connectors 248. As shown in FIG. 2, thermostats 258, 260, 262, of the priorities 252, 254, 256, are operatively connected to the controller 246 via connectors 248. The controller 246 may be a microcontroller 246 or other controller configured for controlling the system 200.

When the controller 246 in system 200 using zone control as shown in FIG. 1 receives a signal from any of the temperature sensors 234, 236, and 238 from any of the zones 210, 212, 214 that more hot water is needed, the controller 246 will operate the respective pumps 240, 242, and 244 and valves systems 226, 228, and valve assembly n 230 to send hot water to the zone 210, 212, 214 needing heat. In some embodiments, the various zones 210, 212, 214 may be assigned a priority in order for the controller 246 make a decision on which zone 210, 212, or 214 should get hot water if the requests for hot water from the respective zones 210, 212, 214 are calling for more water than the appliance 202 can provide. For example, it may be desirable to configure the system 200 so that a request for domestic hot water gets priority over any other requests for hot water. In such a system 200, when the temperature sensor 234 sends a signal to the controller 246 requesting hot water that request is given priority over any other request. In instances where zones such as 212 and 214 of equal priority request hot water, The controller 246 may have an algorithm which provides either zone 212 and 214 (in some sort of alternating manner which may include a timer or other type of format) or both zones 214, 212 hot-water until the requests are satisfied.

When the system 200 is configured as a priority control, it can manage several different temperature requirements by cycling through the operation of the proper zone valve assembly 228, 230, or 232 and/or pump outputs 240, 242, or 244 and temperature settings corresponding with the various priority zones 252, 254, and 256 according to their priority. For example, the highest priority zone 252 may be an indirect water heater requiring 190° F. water. A second priority zone 254 may be a radiant tubing zone required 120° F. water and a third priority zone 256 may be another heating zone having cast iron baseboard heaters requiring 160° F. water.

It will be appreciated that the various priorities zones 252, 254, 256 and their corresponding temperatures are meant to be examples only and additional or other priority zones can be used having different temperature water requirements. It should further be noted that in some cases, some of the zones may require different temperature water and may be controlled under a priority control regime while other zones require the same temperature water and may be controlled under his own control regime in the same system 200. In some embodiments, users may set the temperatures they want to be supplied for the various circuits.

The controller 246 can manage providing hot water at these temperatures by modulating the burner power and providing proper water flow by managing or controlling the circulating pumps 242, 244, and 246 as well as the valve assemblies 228, 230, and 232. In some instances cold or cool water may be added to bring the water supplied to the circuits to the desired temperature.

Figure 3:
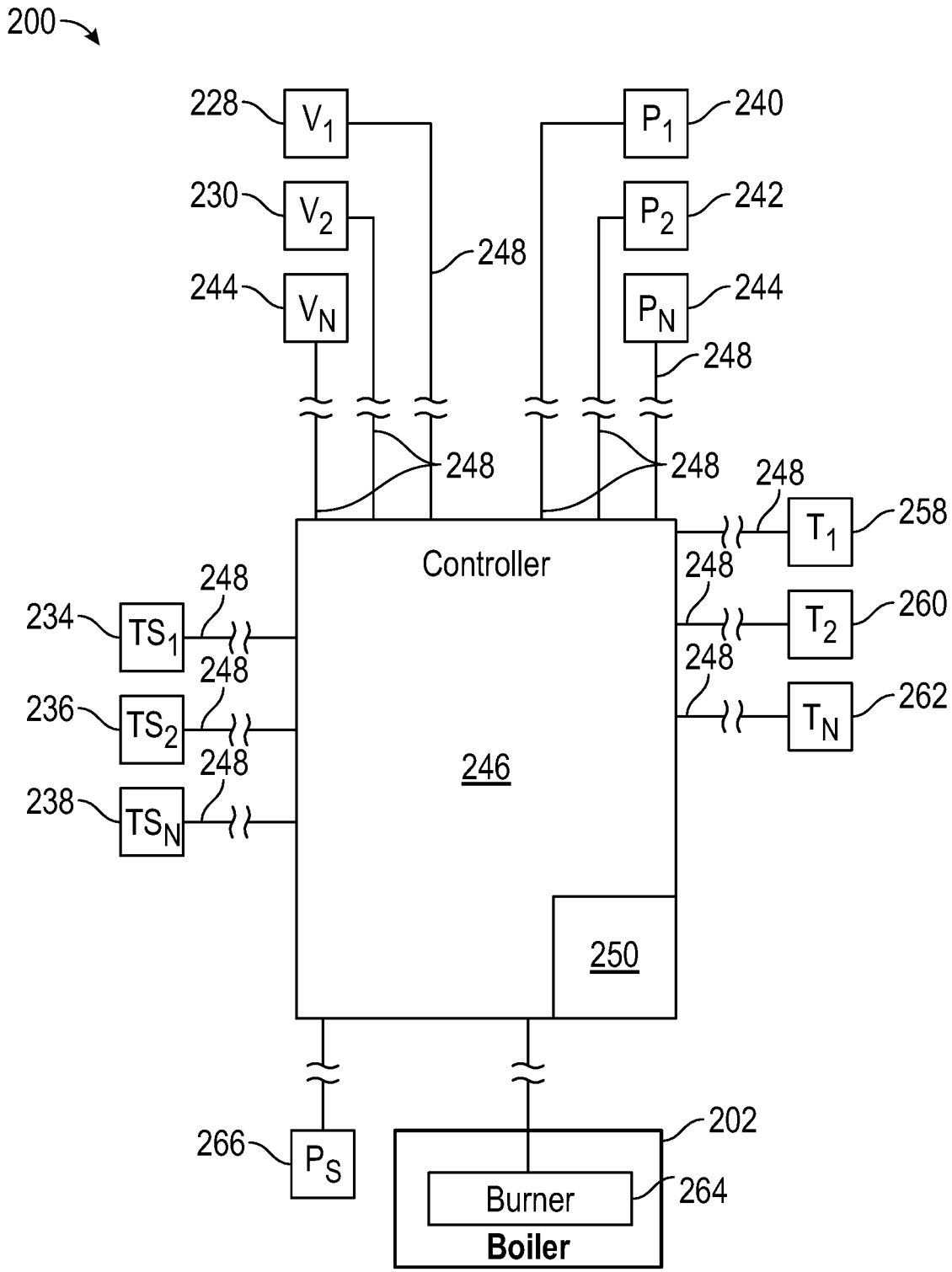
FIG. 3 is a block diagram of a controller for the hydronic system according to an aspect of the disclosure.

FIG. 3 illustrates an example schematic diagram of a hot water system 200. The schematic diagram 200 shown in FIG. 3 could be used with either the zone control system 200 of FIG. 1 or the priority control system 200 of FIG. 2. As shown in FIG. 3, a controller 246 is operatively connected to valve assemblies 228, 230, and 244 via connectors 248. In some cases a wireless transmitter and/or receiver 250 may be used rather than the connectors 248 to connect the controller 246 with various parts for the system 200. The controller 246 is configured to operate these valve assemblies 228, 230, and 244. The controller 246 is also operatively connected to pumps 240, 242, 244 to operate the pumps 240, 242, 244. The controller 246 may also be operatively connected to a system pump 266 which may circulate water through the boiler 202.

The controller 246 is also operatively connected to the boiler 202 and burner 264 within the boiler 202. The controller 246 may operate the boiler 202 and burner 264 in either an on/off configuration or may modulate the burner 264 in order to provide hot water at various temperatures. The controller 246 receives inputs from either or both of the thermostats 258, 260 and 262 or temperature sensors 234, 236, or 238. Based on calls for heat received by signals from these inputs, The controller 246 will operate pumps 240, 242 and 244, the valve systems 228, 230, 244 and the burner 264 within the boiler 202 to direct hot water at temperatures requested by either the thermostats 258, 260, 262 or the temperature sensors 234, 236, 238 to the appropriate zones 210, 212, or 214 or priorities 252, 254, 256.

Figure 4:
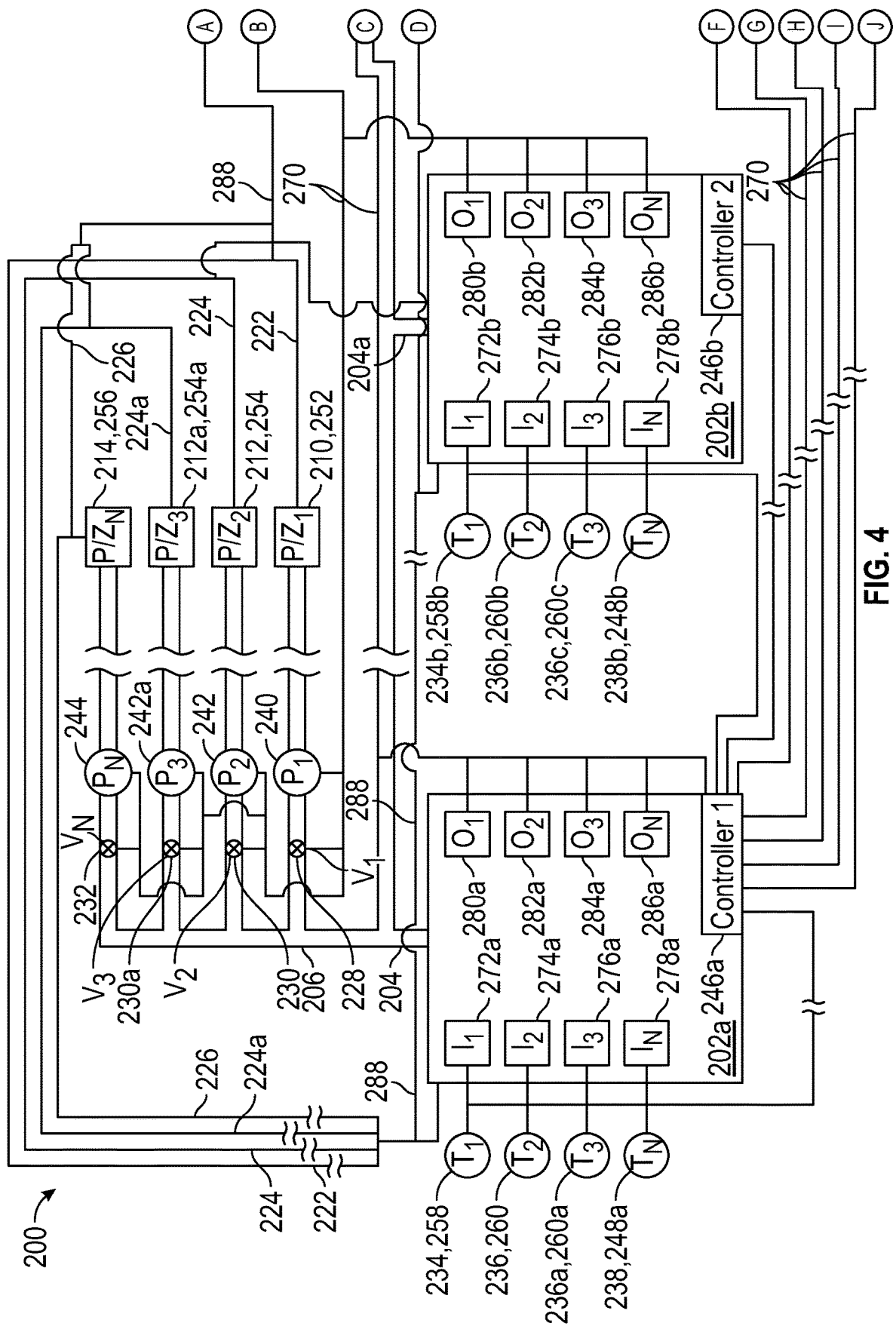
FIG. 4 is a block diagram of a network of boilers according to an aspect of the disclosure.
Figure 4:
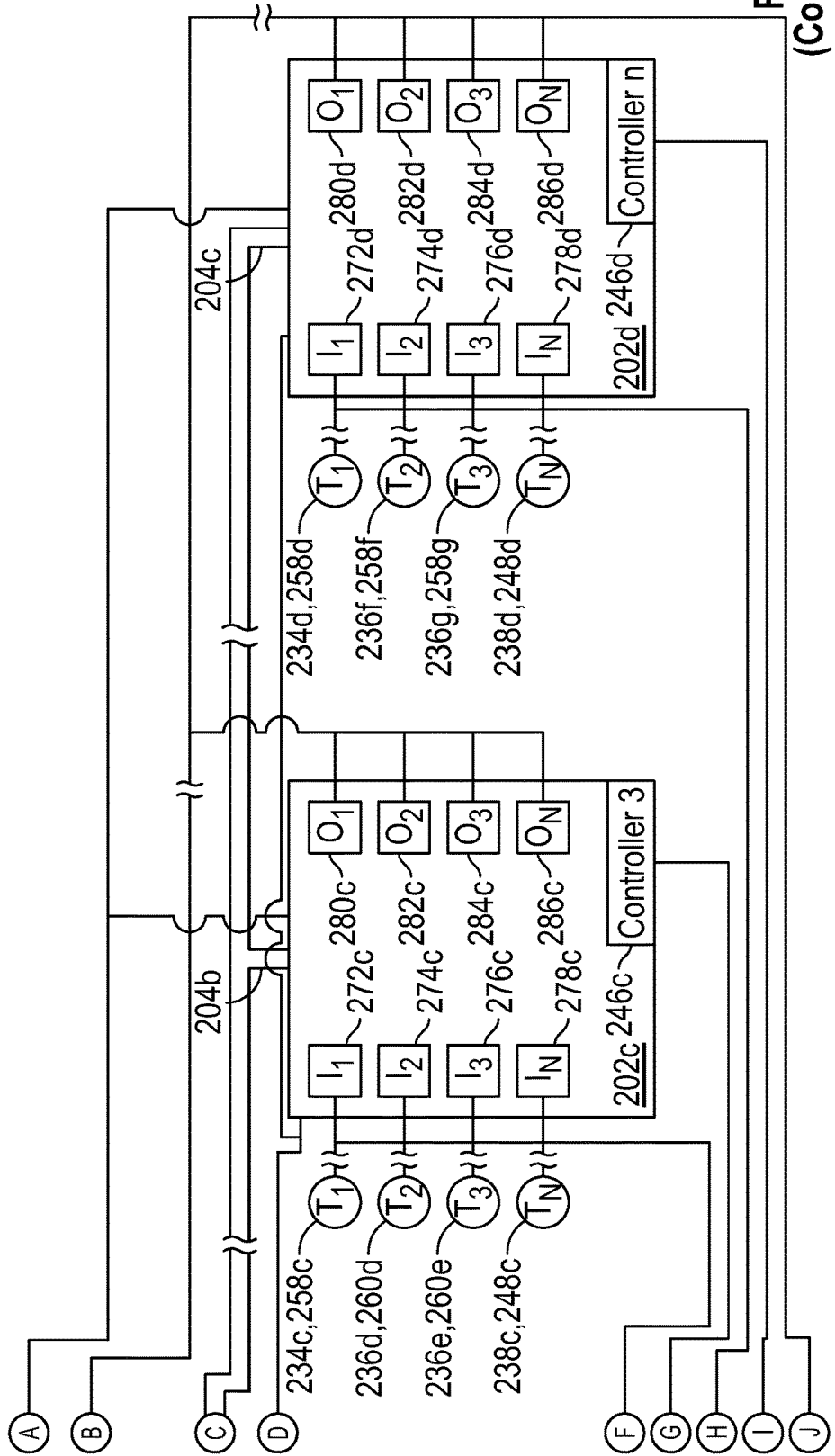

In contrast to FIGS. 1 and 2 were only a single boiler (or other appliances) 202 is used to provide hot water for the system 200, FIG. 4 illustrates a system 200 where several boilers (or other appliances) 202a, 202b, 202c, and 202d are linked together to provide a hot water out the outlets 204 via a common hot water pipe 206 for various priorities and/or zones 210, 252, 212, 254, 212a, 254a, 214, and 256. It should be understood that the FIGS. described and shown herein are schematic and therefor the relative position of the components as shown is not limiting. Further, connections, whether electronic, hydronic, or otherwise may be shown with or without interrupted lines should be understood to not be representative of the exact location and/or length of the connections.

Some systems 200, as shown in FIG. 4. have the ability to use the hardware inputs 272a, 272b, 272c, 272d, 274a, 274b, 274c, 274d, 276a, 276b, 276c, 276d, 278a, 278b, 278c, and 278d and outputs 280a, 280b, 280c, 280d, 282a, 282b, 282c, 282d, 284a, 284b, 284c, 284d, 286a, 286b, 286c, and 286d of each appliance 202a, 202b, 202c, and 202d on the network or system 200, essentially building an intelligent communicating zone/priority control out of the appliance's operating controls 246a, 246b, 246c, and 246d.

It will be understood that the controller 246d marked controller n; the appliance or boiler 202d marked n; valve 232 marked Vn; pump 244 marked Pn; Priority/Zone 214,256 marked P/Zn; Thermostat/acquastat 238,248a, 238b, 248b, 238c, 248c, and 238d, 248d; inputs 278a, 278b, 278c, 278d; outputs 286a, 286b, 286c, and 286d represent additional controllers, appliances, valves, pumps, Priorties/Zones, Thermostat/aupst, inputs, and outputs than what is shown. Systems 200 are not limited to three or four of these features as shown in the FIGS. but may have more which may be represented by the numeral "n."

In some embodiments, the master control 246a allows for the use of every boiler's 202a, 202b, 202c, and 202d inputs 272a, 272b, 272c, 272d, 274a, 274b, 274c, 274d, 276a, 276b, 276c, 276d, 278a, 278b, 278c, and 278d and outputs 280a, 280b, 280c, 280d, 282a, 282b, 282c, 282d, 284a, 284b, 284c, 284d, 286a, 286b, 286c, and 286d to be connected to the network 200. Most modern modulating condensing "ModCon" boilers 202a, 202b, 202c, and 202d may be adapted to be used in accordance with some embodiments of the present disclosure and may include 2 to 4 (or more) heat demand inputs 272a, 272b, 272c, 272d, 274a, 274b, 274c, 274d, 276a, 276b, 276c, 276d, 278a, 278b, 278c, and 278d (usually connected to a thermostat for space heating or aquastat for DHW 234, 258, 236, 260, 236a, 260a, 238, 248a, 234b, 258b, 236b, 260b, 236c, 260c, 238b, 248b, 234c, 258c, 236d, 260d, 236e, 260e, 238c, 248c, 234d, 258d, 236f, 260f, 236g, 260g, 238d, and 248d) and an equivalent number of circulating pump and/or zone valve outputs 228, 240, 239, 242, 230a, 242a, 232, and 244.

The use of every boiler's 202a, 202b, 202c, and 202d inputs 272a, 272b, 272c, 272d, 274a, 274b, 274c, 274d, 276a, 276b, 276c, 276d, 278a, 278b, 278c, and 278d and outputs 280a, 280b, 280c, 280d, 282a, 282b, 282c, 282d, 284a, 284b, 284c, 284d, 286a, 286b, 286c, and 286d to be connected to the network 200 is accomplished using the boiler networks communication bus 270 to transfer the status and assignment of each of the inputs 272a, 272b, 272c, 272d, 274a, 274b, 274c, 274d, 276a, 276b, 276c, 276d, 278a, 278b, 278c, and 278d and allows the master control 246a (the control 246a on the boiler 202a designated as the master for multiple boiler operation) to sequence the all of the boilers inputs 272a, 272b, 272c, 272d, 274a, 274b, 274c, 274d, 276a, 276b, 276c, 276d, 278a, 278b, 278c, and 278d and outputs 280a, 280b, 280c, 280d, 282a, 282b, 282c, 282d, 284a, 284b, 284c, 284d, 286a, 286b, 286c, and 286d.

In so doing, the individual boiler inputs 272a, 272b, 272c, 272d, 274a, 274b, 274c, 274d, 276a, 276b, 276c, 276d, 278a, 278b, 278c, and 278d can all have a priority number assigned to them and a corresponding set of temperatures and actions for that priority. The master boiler control 246a can distinguish these settings and allow all zones with the same priority that are calling for heat to run simultaneously. The master control 246a can then sequence and modulate the boilers 202a, 202b, 202c, and 202d to provide the proper amount of power to achieve the proper temperature water for that priority type.

The master control 246a can then also sequence the boiler network 202a, 202b, 202c, and 202d through all the active priorities by recognizing all the active inputs and managing the time spent by the system 200 trying to satisfy the heat demand for each of inputs receiving a call for heat. Using all the available Thermostats/Aquastas 234, 258, 236, 260, 236a, 260a, 238, 248a, 234b, 258b, 236b, 260b, 236c, 260c, 238b, 248b, 234c, 258c, 236d, 260d, 236e, 260e, 238c, 248c, 234d, 258d, 236f, 260f, 236g, 260g, 238d, and 248d; inputs 272a, 272b, 272c, 272d, 274a, 274b, 274c, 274d, 276a, 276*b*, 276*c*, 276*d*, 278*a*, 278*b*, 278*c*, and 278*d*; outputs 280*a*, 280*b*, 280*c*, 280*d*, 282*a*, 282*b*, 282*c*, 282*d*, 284*a*, 284*b*, 284*c*, 284*d*, 286*a*, 286*b*, 286*c*, and 286*d*; controllers 246*a*, 246*b*, 246*c*, and 246*d*; valves/pumps 228, 240, 239, 242, 230*a*, 242*a*, 232, and 244 for the various priorities and zones 210, 252, 212, 254, 212*a*, 254*a*, 214, and 256 calling for heat (hot water) associated with each of the boilers 202*a*, 202*b*, 202*c*, and 202*d* avoids having to use additional outside controls and the intelligence of the system being able to distinguish the different inputs and their assigned priorities allows the system 200 to provide the proper temperature water to only the zones that require it and safeguard against overheating zones that don't. This provides a cost advantage and better functionality.

Figure 5:
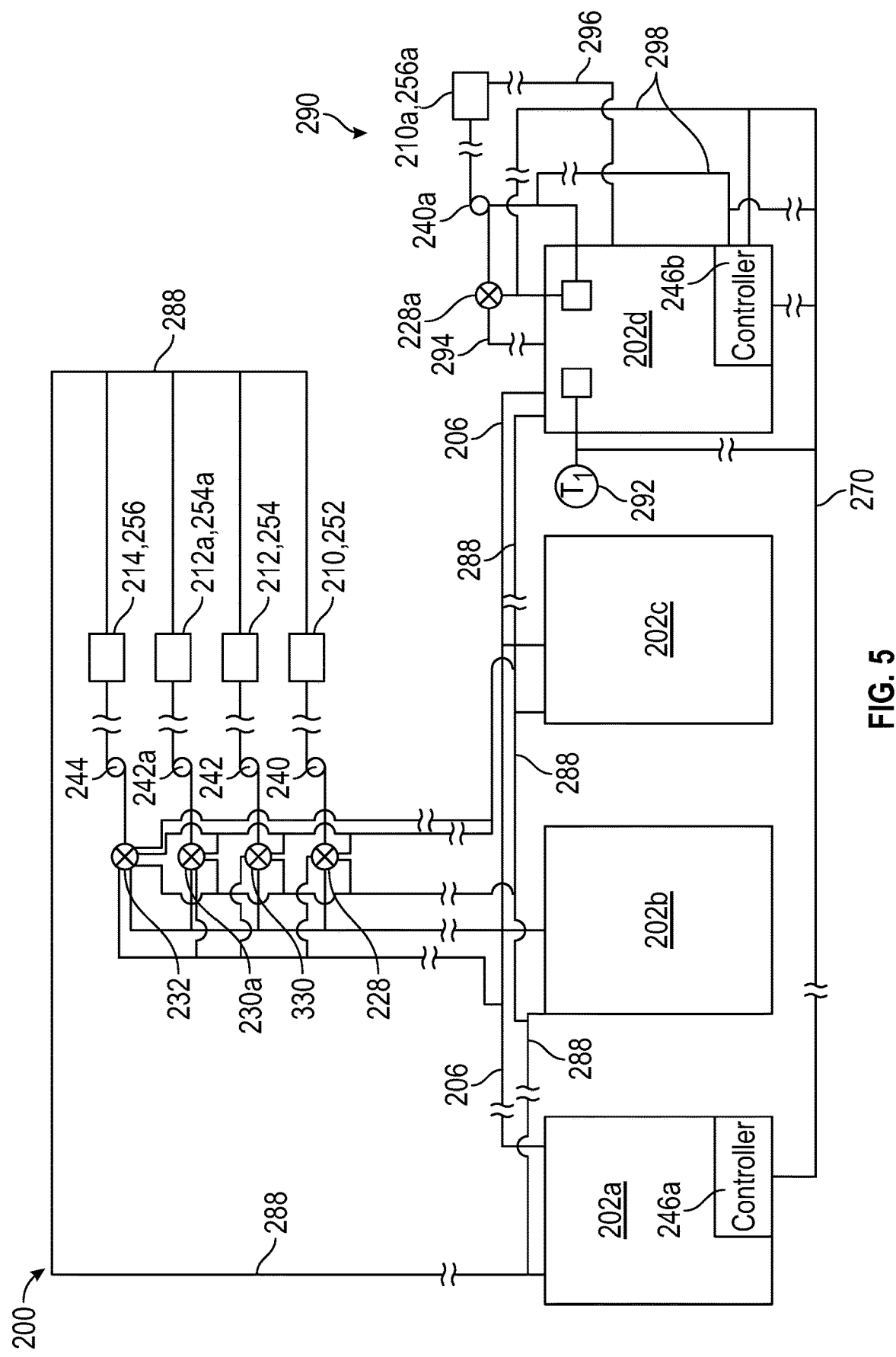
FIG. 5 is a block diagram of a network of boilers with some features removed to better show other features in accordance with an aspect of the disclosure.

FIG. 5 illustrates a system similar to the system of FIG. 4 with many components removed avoid crowding of the FIG. FIG. 4 shows the boilers 202*a*, 202*b*, 202*c*, and 202*d* having hot water outputs 204 fluidly connected to the priorities/zones 210, 252, 212, 254, 212*a*, 254*a*, 214, and 256 via the valves and pumps 228, 240, 239, 242, 230*a*, 242*a*, 232, and 244. The water return lines 288 (also shown in FIG. 4) from the priorities/zones 210, 252, 212, 254, 212*a*, 254*a*, 214, and 256 and the valves and pumps 228, 240, 239, 242, 230*a*, 242*a*, 232, and 244 are also shown.

FIG. 5 also illustrates a system 200 where a boiler 202*d* is connected to a local system 290 that is separate from the overall hot water system 200. The local system 290 may only be served from a single boiler 246*d* or a subset of the total group of boilers 202*a*, 202*b*, 202*c*, and 202*d* in the system 200. The local system 290 may include a local thermostat/aqua stat 292 operatively connected to the priority/zone 210*a*,252*a*, the local valve system 228*a*, local pump or pressure system 240*a*, and the controller 246*d* via a local communication wiring bus 298. The local system 290 includes a local hot water output 294 that brings hot water to the priority/zone 210*a*,252*a* via the local valve system 228*a*, and local pump or pressure system 240*a*. A local water return conduit 296 may return water back to the boiler 202*d* if it is not used in the priority/zone 210*a*, 252*a*.

Some modern boilers often include multiple boiler functionality built-in to their control or rely upon an external multiple boiler control. However, boilers 202*a*, 202*b*, 202*c*, and 202*d* having controls 246*a*, 246*b*, 246*c*, and 246*d* in accordance with present disclosure have more capability and are advantages over what is currently available.

Some currently external multiple boiler controls only have one way communication simply telling the boilers to run with a contact closure or variable signal (0-10V or 4-20 mA). The controls 246*a*, 246*b*, 246*c*, and 246*d* in accordance with the present disclosure have an advantage of the boiler's control's 246*a*, 246*b*, 246*c*, and 246*d* ability to communicate to each other using the communication bus 270 to communicate information such as, but not limited to, current boiler 202*a*, 202*b*, 202*c*, and 202*d* status (available in standby, locked out, operating on Network or Local demands), burner hours, as well as power capacity. Since this information is communicated from all the boilers 202*a*, 202*b*, 202*c*, and 202*d*, the master control 246*a* is able to make better decisions on which boilers 202*a*, 202*b*, 202*c*, and 202*d* are available and how to sequence them.

There are several objectives for the master control 246*a* in these situations: balancing runtime hours on equipment, using the most efficient combination of equipment available, and trying to satisfy the maximum number of demands simultaneously. In some embodiments, the master control 246*a* may be programmed to achieve a desired balance between these objectives.

Some multiple boiler controls 246*a*, 246*b*, 246*c*, and 246*d* have two or three types of staging. "Series" staging simply operates one boiler 202*a*, 202*b*, 202*c*, and 202*d* after another until there are enough boilers 202*a*, 202*b*, 202*c*, and 202*d* at the correct rate to meet the heat load. "Parallel" staging often operates all the boilers 202*a*, 202*b*, 202*c*, and 202*d* simultaneously at the same firing rate, which is in essence similar to a single large boiler operating at that same rate.

Another method being used for modulating boilers 202*a*, 202*b*, 202*c*, and 202*d* is to stage the boilers 202*a*, 202*b*, 202*c*, and 202*d* by modulating the first boiler 202*a* up to a rate that equivalent both the first 202*a* and second boiler 202*b* being operated at their lowest rate. Such a system 200 does this more effectively since it is a communicating system 200 and the master control 246*a* knows the power being put into the system 200 currently and the capacity of the next boiler 202*b*, 202*c*, and 202*d* that will be added. In doing so this way, the master control 246*a* can modulate the boilers 202*a*, 202*b*, 202*c*, and 202*d* that already have their burners on up to the overall input rate at which it would match the overall input rate of adding the next boiler 202*b*, 202*c*, and 202*d* in sequence and modulating all the boilers 202*a*, 202*b*, 202*c*, and 202*d* down to a new lower value.

Using this method, the power being put into the system 200 before the new boiler 202*b*, 202*c*, and 202*d* was added is equivalent to the power after the new boiler is added. This allows a smooth system modulation by controlling the overall power to the system 200 while providing and efficiency benefit gained by allowing the boilers 202*a*, 202*b*, 202*c*, and 202*d* to operate at a lower input rate and achieving their higher part load efficiency. It also considers not operating more boilers 202*a*, 202*b*, 202*c*, and 202*d* than desired for the given condition and maintaining the ability to have a higher overall system modulating turndown ratio (turndown ratio is the ratio of the highest firing rate of a boiler to the lowest firing rate of a boiler). Therefore an 8 boiler system 200 with each boiler 202*a*, 202*b*, 202*c*, and 202*d* having a 5 to 1 turndown ratio can still achieve an 40 to 1 turndown ratio (similar to series sequencing), but provide similar or potentially higher efficiencies than parallel sequencing.

Since parallel sequencing in most controls fires all the boilers 202*a*, 202*b*, 202*c*, and 202*d* at the same rate and each boiler 202*a*, 202*b*, 202*c*, and 202*d* has a certain efficiency loss associated with it being on due to the enclosure of the boiler 202*a*, 202*b*, 202*c*, and 202*d* losing heat to the environment. This "jacket loss" is often the same regardless of the boilers firing rate, therefore the more boilers 202*a*, 202*b*, 202*c*, and 202*d* running the more energy is being lost and that becomes a larger amount relative to the overall system power when there are more boilers 202*a*, 202*b*, 202*c*, and 202*d* firing at a lower input rate.

Figure 6:
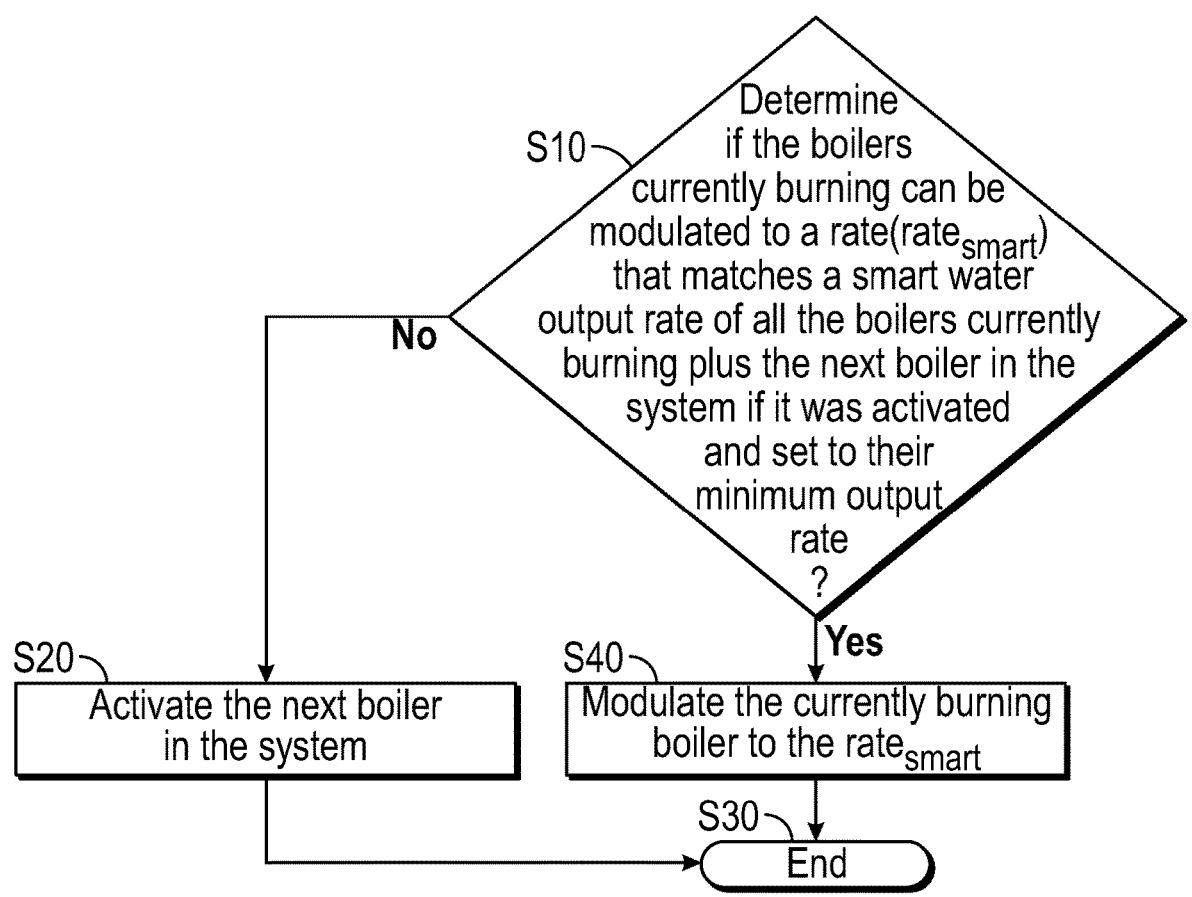
FIG. 6 is a flow chart showing a smart sequencing routine in accordance with an aspect of the disclosure.

FIG. 6 illustrates an example method of controlling the system 200 under an example smart sequencing method. As shown in step S10, the controller 246*a* determines if the boilers currently burning can be modulated to a desired rate (RATEsmart) that matches a water output rate of all the boilers currently burning plus if the next boiler in the system 200 was activated and all these boilers were set to their minimum output rate. If such a rate cannot be achieved as set forth in step S20, then the master controller 246*a* will activate the next boiler in the system 200. That will conclude this portion of the control method as shown in step S30. However if a desired rate (RATEsmart) can be achieved, then the master controller 246*a* will modulate the currently burning boiler or boilers to the desired rate (RATEsmart) as set forth in step S40. That will conclude this portion of the control method as shown in step S30.

Another aspect of a method for controlling the system 200 in accordance with this disclosure includes available appliance management. Available appliance management allows the master boiler 202a (and specifically the master controller 246a) to determine status of all the boilers 202a, 202b, 202c, and 202d on the network 200 and compare the current status to the order in which it would normally be staging the boilers 202a, 202b, 202c, and 202d to meet the heat demand. This information then allows the master boiler's controller 246a to change or modify that order to enable better system versatility such as skipping boilers 202a, 202b, 202c, and 202d that aren't available, such as those locked out in a fault or currently operating on demands that are local to that boiler. Available appliance management allows the system 200 to try satisfying the most amount of demands simultaneously. If the next boiler 202a, 202b, 202c, and 202d to operate its burner to satisfy the "network" heat demand is currently satisfying a "local" heat demand such as an indirect water heater piped in an arrangement only that boiler 202d can provide heat to that tank, the master control 246a will temporarily skip that boiler 202d to use the next boiler 202n (n meaning a different boiler) on the network 200 that is available or in standby. If the heat demand of the network 200 is large enough that all of the available boilers 202a, 202b, 202c, and 202d are unable to meet the demand, the master control 246a will then begin to use boilers 202d that also have these "local" demands and can allow the boiler 202d to split its timer (or hot water) between the "network" and "local" demand until one is satisfied. The boiler 202d then returns to its normal operation for a single demand scenario.

Figure 7:
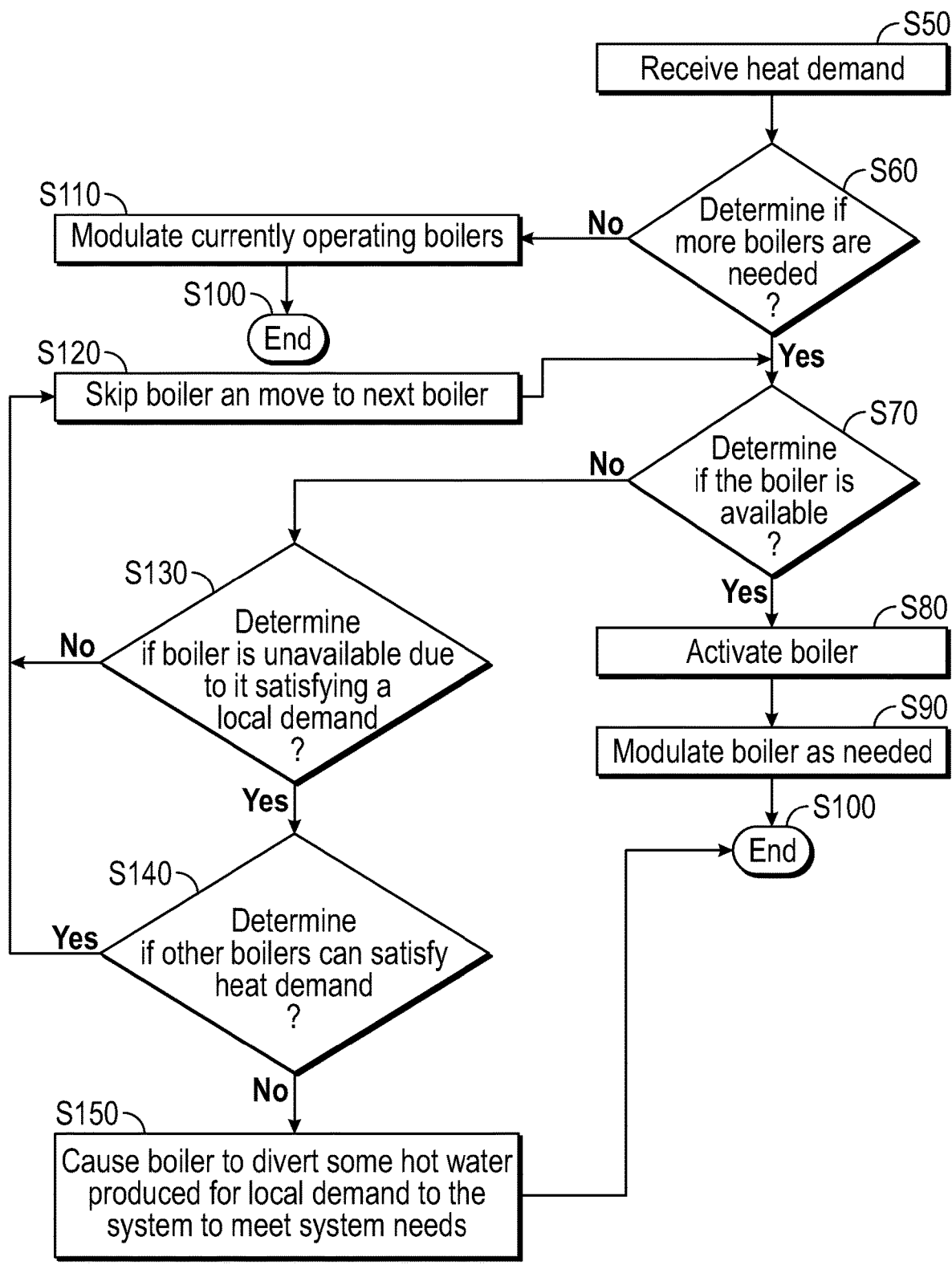
FIG. 7 is a flow chart showing an available appliance management routine in accordance with an aspect of the disclosure.

An example of a method for controlling the system including available appliance management is illustrated in FIG. 7. As shown in step S50, the system 200 or master controller 246a receives a heat demand or demand for hot water S50. At the next step, S60 the controller 246a makes a determination if additional boilers are needed to meet the demand. At step S70 the master controller 246a determines if the next boiler in the system is available. If the next boiler in the system is available, then the master controller 246a will activate the next boiler in the system at step S80. At step S90, the master controller 246a will modulate the newly activated boiler and any other boilers as needed. At which point this feature of the control system will end in step S100. However, if back in step S60, it is determined that no more boilers are needed, then at step S110 the master controller 246a will modulate the operating boilers as needed at which point this feature of the control system will end as set forth in step S100.

If it is determined at step S60 that more boilers are needed but at step S70 is determined that the next boiler in the system is not available, then the master controller 246a will move to step S130 to determine if the boiler is unavailable due to its satisfying a local demand. If it is not unavailable due to satisfying local demand, then the controller to 246a will move to step S120 and skip that boiler and move to the next boiler and returned to step S70. However, back in step S130 if the boiler is unavailable due to that boiler satisfying a local demand, than the master controller 246a will determine if other boilers can satisfy the heat demand at step S140. If other boilers can satisfy the heat demand, than the master controller 246a moves to step S120 where the unavailable boiler is skipped and the controller 246a moves to the next boiler and step S70 as described. However, back in step S140 if it is determined that other boilers cannot satisfy the heat demand, then the master controller 246a will cause the unavailable due to satisfying a local demand boiler to divert some hot water produced for local demand to the system 200 to meet the system needs at step S150. At which point this portion of the control system will and at step S100.

Another aspect of managing the system in accordance with the disclosure is power management for HVAC Systems with multiple load requirements which includes the ability for the multiple appliance network 200 to control its power (heating or cooling) based on the different load requirements for each priority or zone 210, 252, 212, 254, 212a, 254a, 214, and 256 and the desired reaction time.

A system 200 may be limited to a maximum amount of power for one or more of the priorities or zones 210, 252, 212, 254, 212a, 254a, 214, and 256 to avoid overshooting the target temperature. This is especially useful when the master controller 246a is switching the boilers 202a, 202b, 202c, and 202d on the network 200 back and forth between two priorities 210, 212, 212a, and 214 trying to satisfy both, while avoiding overshooting the target on the smaller of the heat demands. It should be understood that the term maximum power may be considered in terms of an amount of hot water or an upper limit of the temperature of hot water.

The maximum amount or temperature of hot water may be limited or controlled by a variety of different variables. For example, the number of boilers 202a, 202b, 202c, and 202d, the amount of modulation of the boilers 202a, 202b, 202c, and 202d, the addition of cold water (from a municipal or other freshwater supply) to dilute hot water temperature, the amount of pumping that is performed, or the operation of valves 228,239,230a, and 232 to deliver hot water to the priorities or zones 210, 252, 212, 254, 212a, 254a, 214, and 256 may be used to limit the amount of power applied. Manipulation of these various variables may be used in accordance with the present disclosure from setting according to individual circumstance for various applications.

Figure 8:
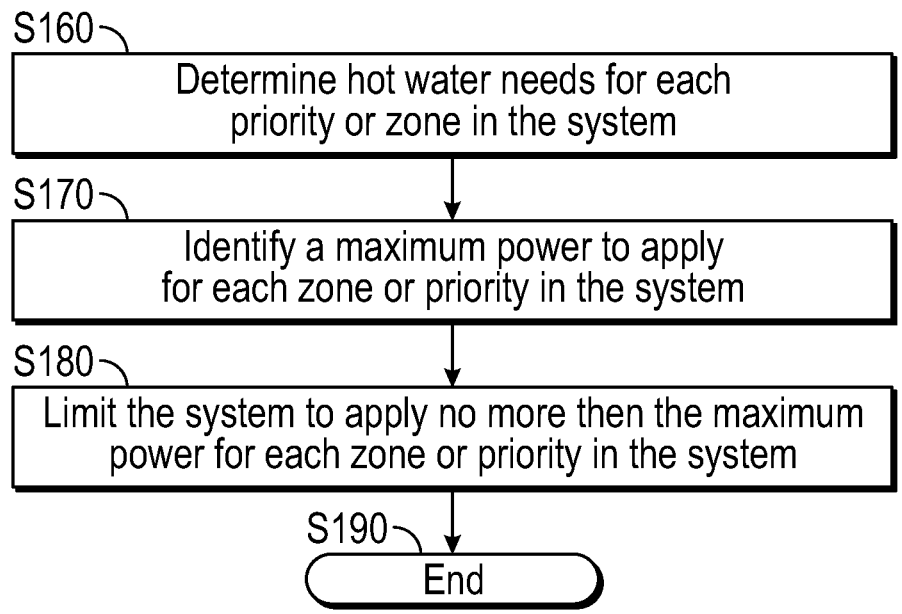
FIG. 8 is a flow chart showing a maximum power application routine in accordance with an aspect of the disclosure.

FIG. 8 is a flowchart of an example method for controlling the system 200 and a way that limits its maximum power output. As shown in step S160 the master controller 246a determines hot water needs for each priority or zone 210, 252, 212, 254, 212a, 254a, 214, and 256 in the system 200. Based on this information the master controller 246a will identify a maximum power to apply for each zone or priority 210, 252, 212, 254, 212a, 254a, 214, and 256 in the system 200 at step S170. Next, at step S180 the master controller 246a will limit the system 200 to apply no more than the maximum power for each zone or priority 210, 252, 212, 254, 212a, 254a, 214, and 256 in the system 200.

In some embodiments, the master controller 246a may automatically learn this limit by monitoring the reaction of the system 200 to certain power settings during different conditions. In other embodiments, this limit may be input into the controller 246a by an operator. An example of when this setting is useful is a building that has a very large heating requirement, but a very small domestic hot water requirement such as a commercial office building. In order for the boiler network 200 to switch back and forth between these two drastically different size heat loads, the master controller 246a could be set to understand the size of each and limit the power setting when the DHW call for heat to not overheat the tank or cause the minimum power for network—a setting that allows the master controller 246a to override the normal add boiler sequencing operation and PI or PID logic to very quickly add boilers 202a, 202b, 202c, and 202d and power by modulating up the currently active boilers 202a, 202b, 202c, and 202d to the system 200 when a faster response is needed for a large heat demand on one of more of the zones or priorities 210, 252, 212, 254, 212a, 254a, 214, and 256.

An example of when this would be useful is a system 200 such as a hotel with a very large heat demand such as the DHW load in the morning when there are a large number of showers running. This would be a situation where the normal network 200 may be able to use the normal add boiler logic to slowly bring on more power and boilers 202a, 202b, 202c, and 202d in order to meet demand, but once the DHW tanks call via the aquastats 234, 236, 236a, 238, 234b, 236b, 236c, 238b, 234c, 236d, 236e, 238c, 234d, 236f, 236g, and 238d there is at least a large enough heat load where a certain number of boilers 202a, 202b, 202c, and 202d or amount of power is needed. This setting allows the master control 246a to immediately react to this call for hot water with this minimum amount of power and then revert to normal modulation algorithms based on temperature response.

Figure 9:
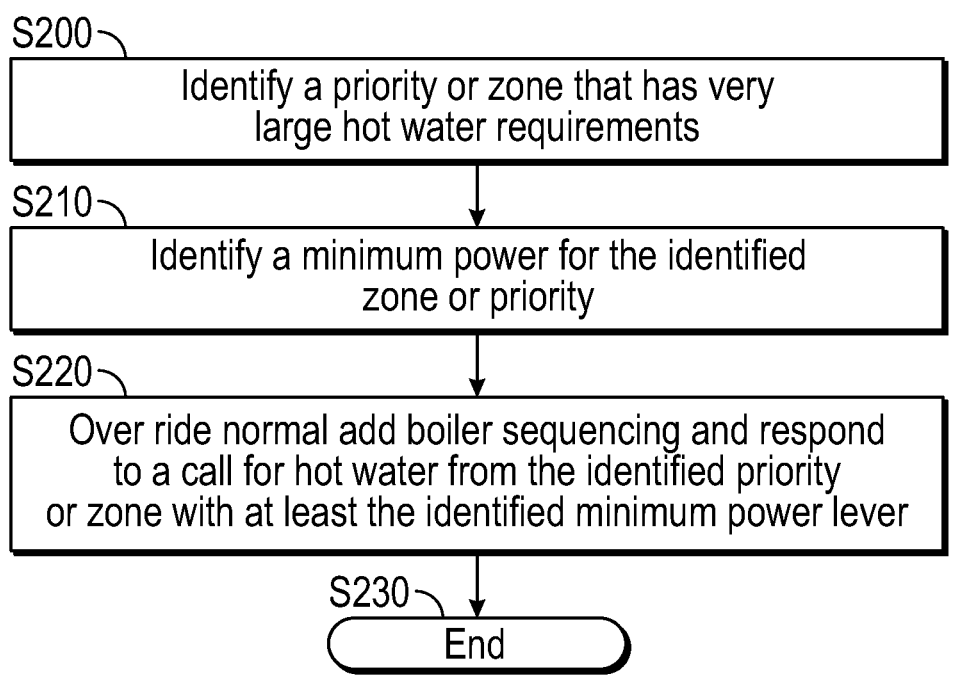
FIG. 9 is a flow chart showing a minimum power application routine in accordance with an aspect of the disclosure.

FIG. 9 illustrates an example flowchart showing steps used to provide minimum power for a network 200. In the first step, step S200 the master controller 246a identifies a priority or zone of the of the priorities and zones 210, 252, 212, 254, 212a, 254a, 214, and 256 that has very large hot water requirements. Next, at step S210 the master controller 246a determines or calculates a minimum amount of power (which may include an amount of hot water, a minimum temperature of the hot water, or some combination of both) to send to the identified zone or priority. In the next step, step S220 the master controller 246a will override normal and boiler sequencing and respond to a call for hot water from the identified priority or zone with at least the identified minimum power level. And then this sequence or portion of the control algorithm is ended at step S30.

Figure 10:
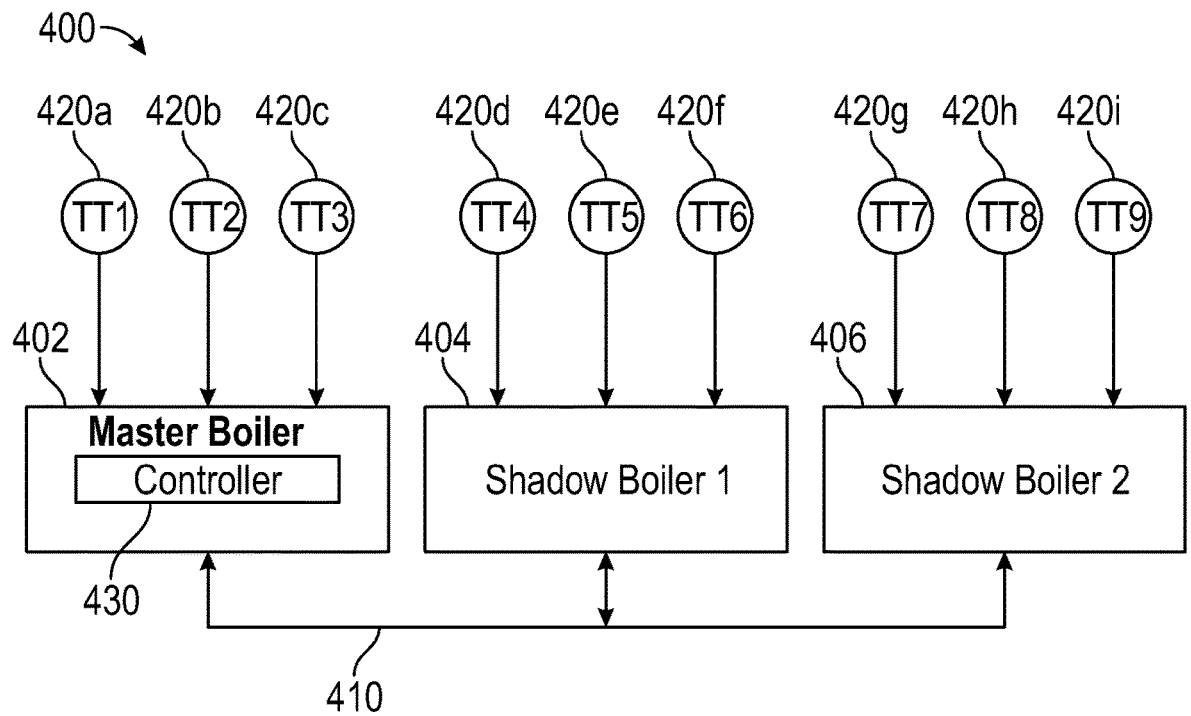
FIG. 10 is a block diagram of a network of boilers according to an aspect of the disclosure.

FIG. 10 is a block diagram of a network of boilers 400 according to an aspect of the disclosure. As shown in FIG. 10, the network of boilers 400 includes a plurality of boilers 402-406. Although three boilers are shown, the network of boilers 400 may include any suitable number of boilers. The plurality of boilers 402-406 are configured to intercommunicate via a bus 410. Each boiler includes respective input from a set of inputs 420a-420i that correspond to sensors associated with heat emitters. When any one of the inputs reports a call for heat, a controller 430 is configured to receive a status and assignment associated with the call for heat.

Figure 11:
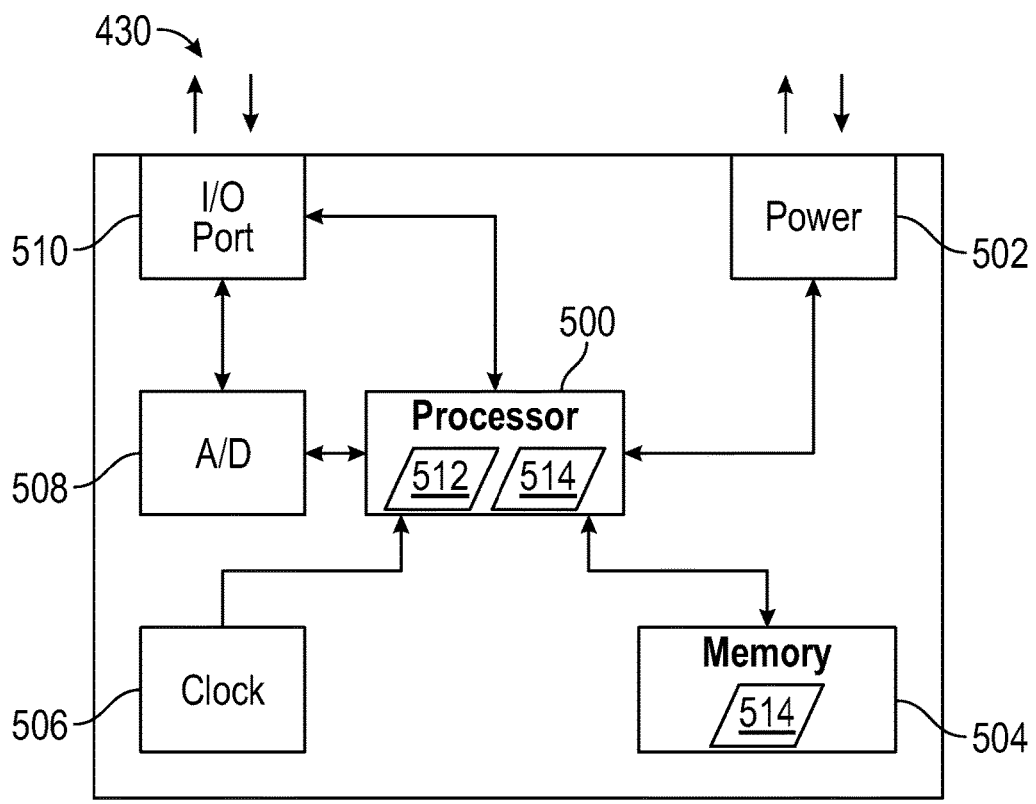
FIG. 11 is a block diagram of a controller in the network of boilers according to an aspect of the disclosure.

FIG. 11 is a block diagram of the controller 430 in the network of boilers according to an aspect of the disclosure. As shown in FIG. 11, the controller 430 includes a processor 500. This processor 500 is operably connected to a power supply 502, memory 504, clock 506, analog to digital converter (A/D) 508, and an input/output (I/O) port 510. The I/O port 510 is configured to receive signals from any suitably attached electronic device and forward these signals to the A/D 508 and/or the processor 500. For example, the I/O port 510 may receive signals associated with temperature measurements from one or more of the sensors and forward the signals to the processor 500. In another example, the I/O port 510 may receive signals via a user interface and forward the signals to the processor 500. If the signals are in analog format, the signals may proceed via the A/D 508. In this regard, the A/D 508 is configured to receive analog format signals and convert these signals into corresponding digital format signals. Conversely, the A/D 508 is configured to receive digital format signals from the processor 500, convert the signals to analog format, and forward the analog signals to the I/O port 510. In this manner, electronic devices configured to receive analog signals may intercommunicate with the processor 500.

The processor 500 is configured to receive and transmit signals to and from the A/D 508 and/or the I/O port 510. The processor 500 is further configured to receive time signals from the clock 506. In addition, the processor 500 is configured to store and retrieve electronic data to and from the memory 504. Furthermore, the processor 500 is configured to determine signals operable to individually modulate the boilers in the network of boilers 400 and thereby control the amount of heat imparted to the heat emitters.

According to an embodiment of the invention, the processor 500 is configured to execute a code 512. In this regard, the controller 430 includes a set of computer readable instructions or code 512. According to the code 512, the controller 430 is configured to modulate a firing order and amount of heat produced by each boiler in the network and direct the generated heat to the appropriate heat emitter. In addition, the controller 430 may be configured to generate and store data to a file 514. This file 514 includes one or more of the following: sensed temperatures; timestamp information; determined temperature profiles (e.g., rate at which the temperature is rising or falling); user input temperature profiles; recommended temperature profiles; DHW usage trends; heating schedules of various performance modes; and the like. Based on the set of instructions in the code 512 and signals from one or more of the sensors, the processor 500 is configured to perform the methods described herein.

Figure 12:
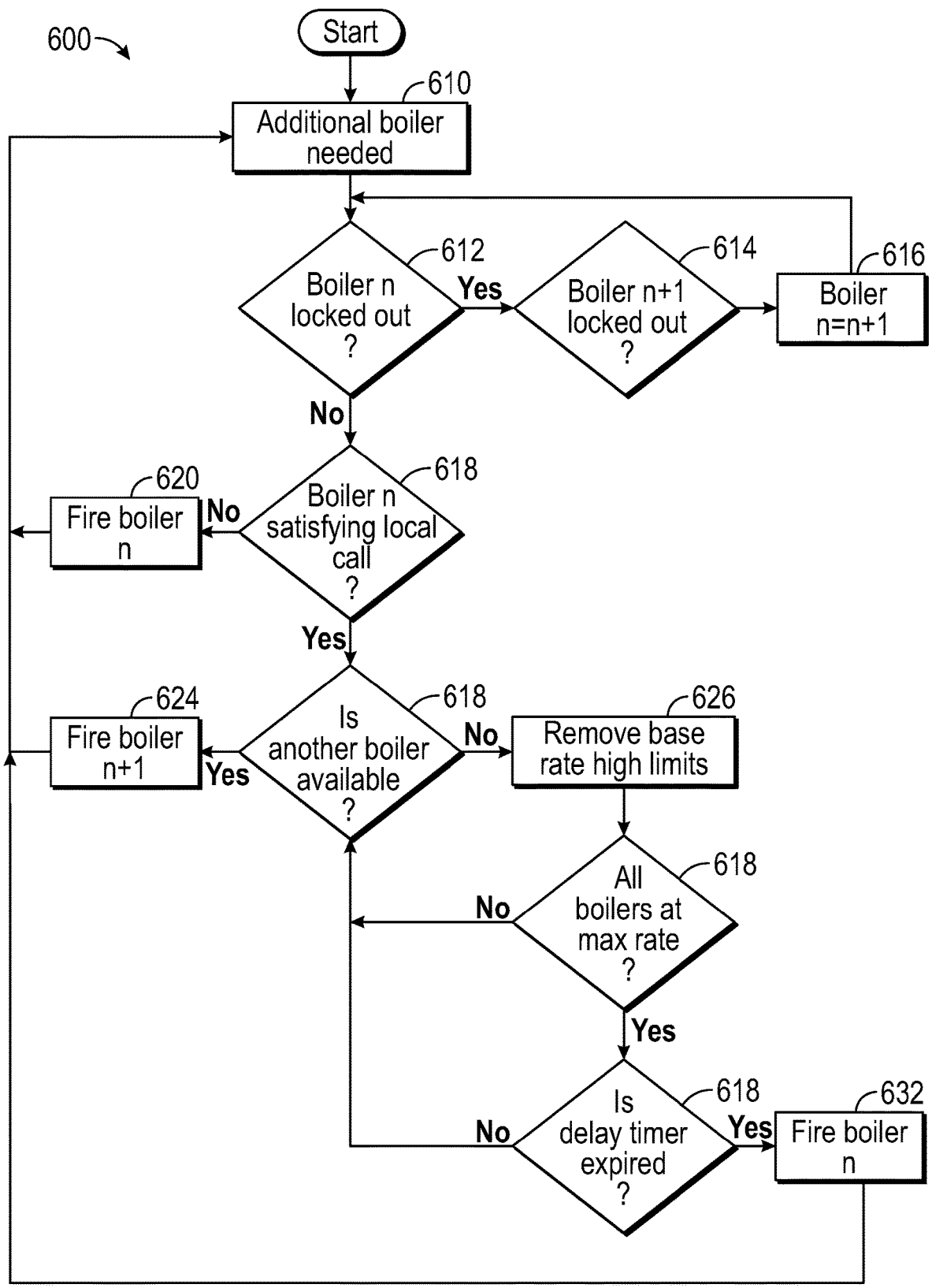
FIG. 12 is a flow diagram of a method of controlling the network of boilers according to an aspect of the disclosure.

FIG. 12 is a flow diagram of a method 600 of controlling the network of boilers according to an aspect of the disclosure. In general, this method 600 provides for networked and local demand functionality of appliances. As shown in FIG. 12, in response to the heat needs exceeding the heat capacity of the currently fired boilers at substep 610, an additional boiler is fired in the network in the following steps 612-632. At step 612, it is determined if the next boiler in the rotation is locked out and, if so, subsequent boilers in the rotation are evaluated at steps 614-616. At step 618, it is determined if the next boiler is servicing a local call for heat and, if not, the boiler is fired.

If the boiler is servicing a local call for heat, it is determined if another boiler is available at step 622 and, if so, the other boiler is fired at step 624. If not, heat output of the fired boilers is raised at step 626. At step 628, it is determined if all boilers are at max heat output and, if so, it is determined if a delay timer locking out a boiler has expired. If so, the previously locked out boiler is fired up.

In this manner, the ability of boiler such as the boilers 404 and 406 that is part of a network of boilers 400 to both operate as part of the network 400 by providing power to the system which the network of appliances is connect, but also switch its operation to "Local" operation to provide power instead to a different portion of the system which it may be the only appliance capable of providing power (heat). This allows each boiler 402-406 in the network 400 to provide power as a group to the main system as part of a "network" demand, but also prioritize between that demand requirement and other "local" demand requirements it is individually responsible for. These demands may all have different operating parameters such as temperature, priority of importance, and power requirements. The communication of these requirements and status of these demands allows the master control to manage these intelligently.

Figure 13:
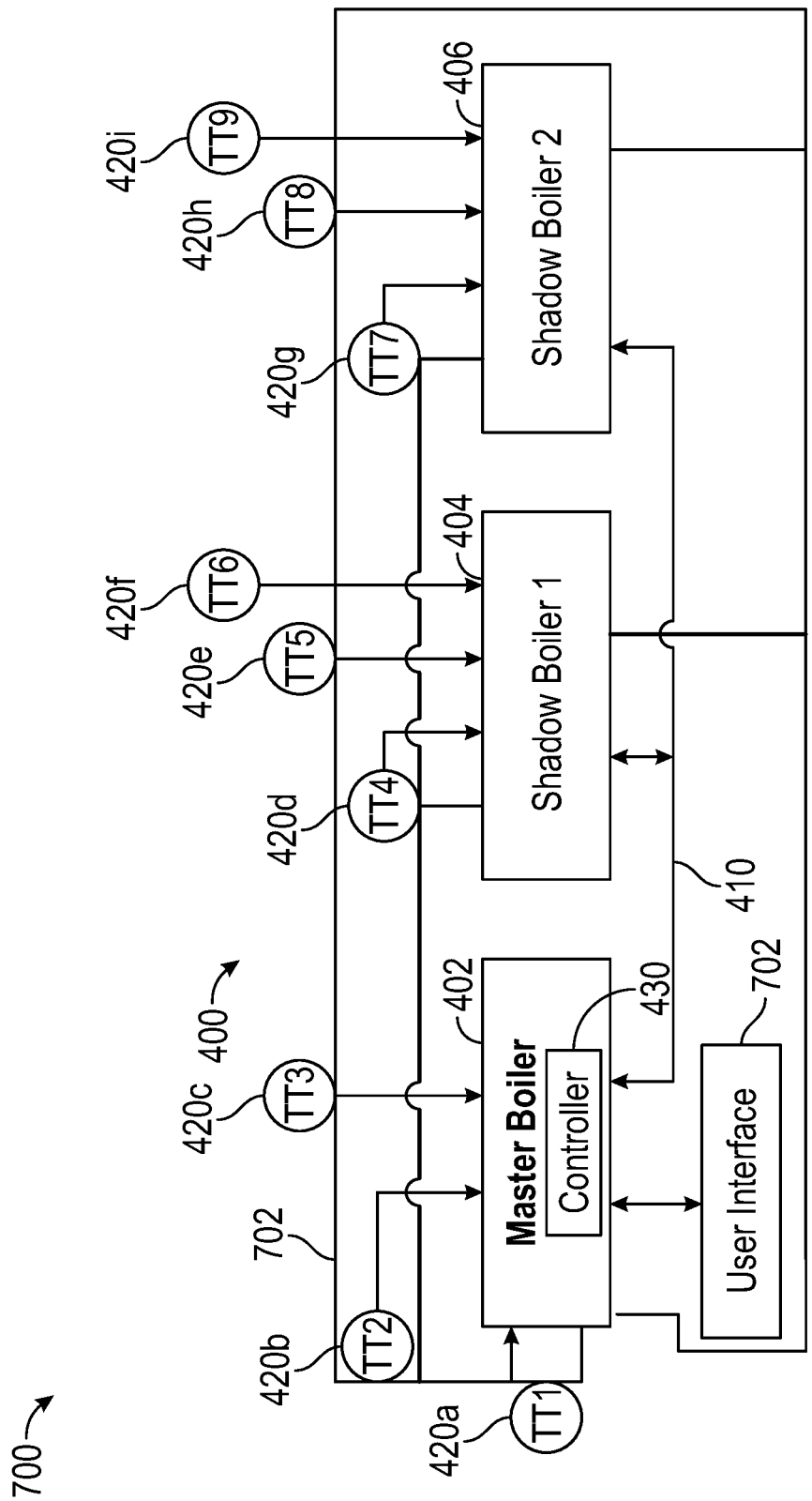
FIG. 13 is a block diagram of a hydronic system according to an aspect of the disclosure.

FIG. 13 is a block diagram of a hydronic system 700 that includes the network of boilers 400 according to an aspect of the disclosure. The hydronic system 700 includes the network of boilers shown in FIG. 10 and thus, for the sake of brevity, those elements described with reference to FIG. 10 may not be described again. As shown in FIG. 13, the hydronic system 700 includes a hydronic loop 702 configured to convey energy in the form of heated water from the plurality of boilers 402-406 throughout the hydronic system 700 and to various heat emitter (not shown). Again, although three boilers are shown, the network of boilers 400 may include any suitable number of boilers and the hydronic system 700 may include any suitable number of heat emitters, zones, pumps, valves, sensors, and the like. The plurality of boilers 402-406 are configured to intercommunicate via a bus 410. Each boiler includes respective input from a set of inputs 420a-420i that correspond to sensors associated with heat emitters and/or sensors such as outlet temperature sensors, ambient temperature sensors, and the like. When any one of the set of inputs 420a-420i reports a call for heat or otherwise forwards a sensor measurement, the controller 430 is configured to receive this information as described herein.

In the event of a sensor failure, the controller 430 is configured to implement one or more countermeasures to compensate for the failed sensor while also alerting the user to the sensor failure. For example, if input 420b is configured to report the temperature of the hydronic loop 702 and the associated sensor TT2 fails, the controller 430 is configured to average the outlet temperatures as reported by 420a, 420d, and 420g. In addition or alternatively, the controller 430 is configured to control the boilers 402-406 to generate water at the temperature called for. In another example, if an outside air temperature sensor that is directly connected to the controller 430 fails, the controller 430 is configured to poll the network of boilers 400 to determine is another outside air temperature sensor is connected to the network of boilers 400 and, if so, utilize that sensor while also alerting the user to the sensor failure. In yet another example, if a sensor fails, the controller 430 is configured to utilize sensor readings from a nearby sensor.

It is an advantage of the hydronic system 700 that the controller 430 may provide additional heat demand staging. For example, if the boilers 402 and 404 are relatively higher efficiency boilers than the boiler 406 and the boiler 406 has relatively greater heat generating capacity than the boilers 402 and 404, then the controller 430 is configured to fire the boiler 406 preferentially in response to the heat demand or the expected heat demand exceeding the heat capacity of the boilers 402 and 404. In this regard, it is common to have an older, legacy high capacity boiler in an otherwise modern multi-boiler system. In such system, it is typical to assign the lowest firing priority to the legacy boiler so that the more modern and fuel efficient boilers are utilized. However, in some situations, the legacy boiler may be more efficient and it may be detrimental to the legacy boiler to be fired for short periods of time due to condensation issues and the relatively higher thermal mass typically found in older boilers. It is an advantage of the hydronic system 700 that the controller 430 may utilize outside air temperature and/or prior history to calculate expected demands in order to determine if the boiler 406 should be fired preferentially over the boilers 402 and 404. In this manner, the controller 430 is configured to optimize the efficiency of the hydronic system 700 and the role of each the boilers 402-406 may change from primary to secondary and vice-versa based upon the deciding variable.

It is another advantage of the hydronic system 700 that the controller 430 may include configurable auxiliary inputs and outputs. This feature allows the installer or user to configure the input or output differently for the desire operation. For example, any output of the controller 430 may be configured as the system circulating pump. When configured in this way the controller 430 recognizes this configuration and can energize this output when appropriate based on additional settings. Additional optional output configurations may include: always on in which the output is always on when the system is powered; externally switched in which the output is on whenever the corresponding input is switched on; outdoor below warm weather shutdown in which the output is on whenever the outdoor temperature drops below the warm weather shutdown temperature setting. Additional optional input configurations may include: the output is on whenever there is a call for heat from any thermostat input; any thermostat input based on its priority settings in which the output is on whenever the master control is actively running the boiler network on a priority for which the output is assigned to operate; and any burner demand in which the output is on whenever the master control requires any of the appliances to operate their burner.

It is another advantage of the hydronic system 700 that the controller 430 may include a manual test mode operation for multiple appliance system. In this manner, the controller 430 is configured to temporarily modify the operation of the boiler network 400 in order for setup and diagnostic purposes. This is an important feature due to the fact that in order to test an individual boiler (such as high fire or low fire combustion testing) the hydronic system 700 needs to be put in a condition where all the inputs and outputs are in the appropriate condition to allow safe operation. The hydronic system 700 allows a selection of this option which temporarily suspends normal operation of the network sequencing and allows the individual boilers to be tested. For example, rather than attempting to fire a boiler by generating heat demands or removing a boiler from the network to test the boiler, the controller 430 may be configured to initiate test operations of any of the boilers 402-406.

It is another advantage of the hydronic system 700 that the controller 430 is configured to control and receive input from a user interface 702 for the hydronic system 700. The user interface 702 is operable to display the status of all the boilers 402-406 on the boiler network 400 including their current status, modulation rate, outlet temperature, and rotation order. Optionally, the user interface 702 is operable to display all the inputs available on the network, how each input is configured, and the current status of each input. In this manner, the user is provided with a display of all relevant information related to the hydronic system 700. This provides the user with the ability to determine if the hydronic system 700 is configured properly and what the current status is of the networks inputs and outputs.

INDUSTRIAL APPLICABILITY

Various embodiments of the present invention provide for an improved hydronic heating system. In some embodiments, the hydronic heating system includes a network of boilers configured to function together to provide heat to a variety of heating uses. The aspects disclosed herein include a variety of benefits. These benefits include control related benefits that are beneficial due to the fact that a boiler (and other types of appliances) are often only a component of a much larger system such as a building's HVAC system. Each HVAC system has to be designed for the particular building's needs and often require a control system to be designed consisting of the appliance controls, ancillary controls, relays, timers, sensors, etc. These systems are often limited by the ability for the components and controls of the system to communicate and sequence themselves intelligently. The design of the control system is also very dependent on the ability of the installer and the financial budget. We believe that these improvements of the appliance control allow for more efficient and convenient control of the system at a lower cost than less sophisticated and capable solutions. Most also allow to use the boilers to manage multiple demands from the system for example providing a balance of spending time satisfying a domestic hot water (DHW) load and a heating load even when they are drastically different in size. Preferred embodiments of the invention will now be further described with reference to the drawing figures, in which like reference numerals refer to like parts throughout.

The zones in a hydronic system often require different types of heat emitters (baseboard, radiant tubing, fan coils, etc.) due to the nature of the installation. Radiant tubing for example is often the best choice to install in or under floors that will have hardwood, tile, or vinyl surfaces since it is able to transfer heat through these materials very well and allow the system to run at a very high efficiency. In another example copper finned-tube baseboard may be used in rooms with carpet installed and fan coils may be used for spaces where forced air circulation is desired. Boilers are often also used to heat domestic hot water through the use of a brazed plate heat exchanger or tube heat exchanger.

Normally in order to control the temperature of each of these zones is to mount a thermostat in each zone which senses the air temperature and when it drops below the setpoint it electrically signals the Zone Control, Multiple Boiler Sequencing Control, or boiler itself to provide heat. Depending on the control configuration one or more of these items may also control the circulating pumps, zone valves, and other equipment associated with that zone to operate. As you can tell a building that is using multiple boilers with multiple zones consisting of multiple types of heat emitters can quickly become a complex control scenario.

In order to control hydronic systems in this manner without the need for ancillary controls the boiler needs to have an equal or greater number of thermostat inputs and zone valve or circulating pump outputs than the number of zones. Often this is not the situation and an additional Zone Control is added to the system which has multiple thermostat inputs and usually a corresponding number of circulating pump outputs. The Zone Control receives signals from the thermostats, turns on the corresponding valves and/or circulating pumps for that zone, and then sends a signal to the boiler to operate.

It is important to understand that the different types of heat emitters require different water temperatures to perform properly. Sending too cold of water to a high temperature heat emitter such as a fan coil (a heat exchanger with water circulating though it and a fan blowing air past it to heat a space) would result in the air feeling cold to the occupants. Conversely if the temperature of the system water is too hot for a low temperature heat emitter, such as radiant tubing inside of a concrete floor, it could cause damage to the heat emitter, surrounding material, or a risk of scalding occupants.

Current zone controls can usually at best distinguish two different groups of zones. Usually treating one with a higher priority than the other. Meaning when a thermostat from a zone calls designated as the higher priority the Zone Control will turn off the zone valve(s) and/or circulating pump(s) for all of the lower priority zones and then turn on the zones valves and/or circulating pump(s) for all the corresponding higher priority zones. The Zone Control in these situation may have different signals to communicate to the boiler depending on if the higher priority or lower priority zones are calling for heat.

Systems with a large number of zones and/or required temperatures become difficult to install, configure, and control correctly since these zone controls have a finite number of zones they can handle and have these usually only the two priority designations. Using multiple zone controls does not increase the number of priorities therefore most systems that require several different temperatures for the different types of zones simply require the boiler to always produce the highest temperature and thermostatic mixing valves are installed on each of the lower temperature zones which mix the water down to the temperature required for that zone. This is an inefficient way to the run the system since boilers operate more efficiently at lower water temperatures. Also the control system needs to insure that all low temperature zones are shutdown when running high temperature water and vice-versa. Using multiple boilers in these situations often makes this a more difficult problem to solve.

These systems are very typical in application and the task of building a control system is often left up to the installing contractor who buys all of the components including boilers, controls, circulating pumps, valves, and thermostats and integrates them into an overall control strategy.

Multiple Appliance I/O for HVAC Networks—the ability to use the hardware inputs and outputs of each appliance on the network, essentially building an intelligent communicating zone control out of the appliances operating controls. Most modern modulating condensing "ModCon" boilers include 2 to 4 heat demand inputs (usually connected to a thermostat for space heating or aquastat for DHW) and an equivalent number of circulating pump and/or zone valve outputs. These are only available for single boiler operation and may have limited use for multiple boiler application. Our new control allows for the use of every boiler's inputs and outputs which is connected to the network. This is accomplished using the boiler networks communication bus to transfer the status and assignment of each of the inputs and allows the Master Control (the control on the boiler designated as the master for multiple boiler operation) to sequence the all of the boilers inputs and outputs. In doing so this way the individual boiler inputs can all have a priority number assigned to them and a corresponding set of temperatures and actions for that priority. The master boiler control can distinguish these settings and allow all zones with the same priority that are calling for heat to run simultaneously. The master control can then sequence and modulate the boiler networks burners to provide the proper amount of power to achieve the proper temperature water for that priority type. The master control can then also sequence the boiler network through all the active priorities by recognizing all the active inputs and managing the time spent by the system trying to satisfy the heat demand for each of these. Using all the available control hardware in this manner on each of the boiler avoids having to use additional outside controls and the intelligence of the system being able to distinguish the different inputs and their assigned priorities allows the system to provide the proper temperature to only the zones that require it and safeguard against overheating zones that don't. This provides a cost advantage and better functionality.

Multiple Appliance Sequencing—modern boilers often include multiple boiler functionality built-in to their control or rely upon an external multiple boiler control. Our Evergreen boiler control is an example of a built-in multiple boiler control is and it has advantages over what is available today. Most external multiple boiler controls only have one way communication simply telling the boilers to run with a contact closure or variable signal (0-10V or 4-20 mA). The Evergreen control has an advantage of the boilers ability to communicate to each other including their current status (available in standby, locked out, operating on Network or Local demands), burner hours, as well as power capacity. Since this information is communicated from all the boilers the master control is able to make better decisions on which boilers are available and how to sequence them.

There are several objectives for the master control in these situations: balancing runtime hours on equipment, using the most efficient combination of equipment available, and trying to satisfy the maximum number of demands simultaneously. We have made two improvements in these areas: "Smart" Sequencing—most multiple boiler controls have two or three types of staging; "Series" staging simply operates one boiler after another until there are enough boiler at the correct rate to meet the heat load; and "Parallel" staging often operates all the boilers simultaneously at the same firing rate, which is in essence similar to a single large boiler operating at that same rate.

A more recent method being used for modulating boilers is to stage the boilers by modulating the first boiler up to a rate that equivalent both the first and second boiler being operated at their lowest rate. Our system does this more effectively since it is a communicating system and the master control knows the power being put into the system currently and the capacity of the next boiler that will be added. In doing so this way, the master control can modulate the boilers that already have their burners on up to the overall input rate at which it would match the overall input rate of adding the next boiler in sequence and modulating all the boilers down to a new lower value. Using this method the power being put into the system before the new boiler was added is equivalent to the power after the new boiler is added. This allows a smooth system modulation by controlling the overall power to the system while providing and efficiency benefit gained by allowing the boilers to operate at a lower input rate and achieving their higher part load efficiency. It also considers not operating more boilers than desired for the given condition and maintaining the ability to have a higher overall system modulating turndown ratio (turndown ratio is the ratio of the highest firing rate of a boiler to the lowest firing rate of a boiler). Therefore an 8 boiler system with each boiler having a 5 to 1 turndown ratio can still achieve an 40 to 1 turndown ratio (similar to Series Sequencing), but provide similar or potentially higher efficiencies than Parallel Sequencing. Since Parallel Sequencing in most controls fires all the boilers at the same rate and each boiler has a certain efficiency loss associated with it being on due to the enclosure of the boiler losing heat to the environment. This "jacket loss" is often the same regardless of the boilers firing rate, therefore the more boilers running the more energy is being lost and that becomes a larger amount relative to the overall system power when there are more boilers firing at a lower input rate.

Available Appliance Management—this feature allows the master boiler to determine status of all the boilers on the network and compare that to the order in which it would normally be staging the boilers to meet the heat demand. This then allows the master boiler to change or modify that order to enable better system versatility such as skipping boilers that aren't available, such as those locked out in a fault or currently operating on demands that are local to that boiler. This allows the system to try satisfying the most amount of demands simultaneously. If the next boiler to operate its burner to satisfy the "network" heat demand is currently satisfying a "local" heat demand such as an indirect water heater piped in an arrangement only that boiler can provide heat to that tank, the Master control will temporarily skip that boiler to use the next boiler on the network that is available or in standby. If the heat demand of the network is large enough that all of the available boilers are unable to meet the demand the Master control will then begin to use boilers that also have these "local" demands and can allow the boiler to split its time between the "network" and "local" demand until one is satisfied. The boiler then returns to its normal operation for a single demand scenario.

Power Management for HVAC Systems with Multiple Load Requirements—the ability for the multiple appliance network to control its power (heating or cooling) based on the different load requirements for each priority or zone and the desired reaction time. Our system allows two types of functionality: Maximum Power for Network—this setting allows the control to limit the amount of power for one or more of the Priorities or Zones in a system to avoid overshooting the target temperature. This is especially useful when the control is switching the boilers on the network back and forth between two priorities trying to satisfy both, while avoiding overshooting the target on the smaller of the heat demands. This is currently a manual setting in which the installer sets the maximum power required for each priority or zone, but this could be improved upon by allowing the control to automatically learn this limit by monitoring the reaction of the system to certain power settings during different conditions. An example of when this setting is useful is a building that has a very large heating requirement, but a very small domestic hot water requirement such as a commercial office building. In order for the boiler network to switch back and forth between these two drastically different size heat loads the control could be set to understand the size of each and limit the power setting when the DHW call for heat to not overheat the tank or cause the; and Minimum Power for Network—this setting allows the control to override the normal add boiler sequencing operation and PI or PID logic to very quickly add boilers and power to the system when a faster response is needed for a large heat demand on one of more of the Zones or Priorities. An example of when this would be useful is a system such as a hotel with a very large heat demand such as the DHW load in the morning when there are a large number of showers running. This would be a situation where the normal space heating network may be able to use the normal add boiler logic to slowly bring on more power and boilers in order to meet demand, but once the DHW tanks call you know there is at least a large enough heat load where a certain number of boilers or amount of power is needed. This setting allows the master boiler control to immediately react to this network call with this minimum amount of power and then revert to normal modulation algorithms based on temperature response.

HVAC System Configuration Wizard—allows configuration of a single appliance or a network of appliances to be setup by asking a series of questions to the installer. The remaining questions change based upon the questions answered to that point allowing simple configuration of all the parameters for a single appliance or network of appliances. When the wizard is complete all of the parameters within the control have been set to the appropriate value. A related feature is the ability of the control to be set in either "basic" or "advanced" mode. While in "basic" mode only a subset of the settings is visible or able to be changed. This reduces the complexity of navigating the control.

Network and Local Demand Functionality for Appliances—the ability of an appliance (boiler) that is part of a network of boilers to both operate as part of the network by providing power to the system which the network of appliances is connect, but also switch its operation to "Local" operation to provide power instead to a different portion of the system which it may be the only appliance capable of providing power (heat). This allows each appliance in a network to provide power as a group to the main system as part of a "network" demand, but also prioritize between that demand requirement and other "local" demand requirements it is individually responsible for. These demands may all have different operating parameters such as temperature, priority of importance, and power requirements. The communication of these requirements and status of these demands allows the master control to manage these intelligently (see above).

Programmable Combination Priority and Zone Appliance Control—modern appliances such as boilers often include the ability of either controlling several zones of the same temperature (zone control) or groups of zones at different temperatures (priority control). Our control allows the flexibility to do either one or a combination. When configured as a zone control it receives a signal from thermostat(s) or temperature sensor(s) and simply turns on the corresponding zone valves and/or pumps and targets the appropriate temperature. Since zones in this sense all have the same temperature requirements, they can all run in any combination required. When configured as a Priority Control it can manage several different temperature requirements by cycling through the operation of the proper zone valve and/or circulating pump outputs and temperature settings corresponding with the zones requiring power (heat) according to their priority. For example the highest priority zone may be an indirect water heater requiring 190 F water, the second priority may be a radiant tubing zone requiring 120 F, and a third priority may be another heating zone with case iron baseboard requiring 160 F water. The control can manage providing water at these temperatures by modulating the burner power and providing proper water flow by managing the circulating pumps and/or zone valves.

Network Temperature Sensor Failure Countermeasure—the ability for a network of appliances which normally use a common sensor in the system for operation to revert to an alternative control strategy if that sensor fails or becomes unavailable. There are several situations and methods of interest. If the water temperature sensor that the network uses to monitor the actual temperature of the system comparing it to the desired target temperature in order to control the modulation of power fails or becomes unavailable: Instead use the average outlet temperature of all the appliances in operation (operating their burner) to replace the feedback from this sensor; Instead of looking for feedback from this sensor limit each of the appliance's output temperature to the temperature that was desired at the sensor location; and If any other type of sensor fails on the network, for example the outdoor air temperature sensor, search the remainder of the appliance network connections to determine if there is another available sensor to use.

Additional Heat Demand Staging—our additional heat demand is currently a patented technology (U.S. Pat. No. 7,547,863) in which an appliance enables an auxiliary output (for example a dry contact or 0-10V signal) when it has determined that it cannot satisfy the system requirement by itself or in the time required. The idea of the new invention is an improvement on this functionality by controlling these outputs more intelligently. Previously the additional heat demand contact enabling the supplemental appliance was simply based upon the system not reaching the desired temperature in a set amount of time and the order of operation never changes (the boiler is either always the first appliance and the output is the second or vice-versa). The new invention allows the additional heat demand output to switch between being the first action or the second after the appliance runs based upon the outdoor air temperature or the target water temperature calculated for the system to provide. This would allow the appliance control to optimize the efficiency of the system and the role of each appliance may change from primary to secondary and vice-versa based upon the deciding variable.

High Altitude Appliance Adjustment—due to barometric pressure conditions at high altitude appliances often need adjustments made for their proper operation. The idea of our new control is to allow the installing contractor to enter the altitude of the installation into the control and it will automatically adjust its operating parameters such as blower speeds (example increase ignition speeds, high fire, and low fire). Previous methodology would require a different control for high altitude or allowing the contractor to adjust these blower speeds to specific values. The proposed method is a lot more straightforward for the installer.

Configurable Auxiliary Inputs and Outputs on HVAC Appliance Control—similar to the ability of our control to be allow the use of any of the input and outputs. This feature allows the installer or user to configure the input or output differently for the desire operation. Our first use of this functionality is to allow any of the boiler controls control outputs to be configured as a system circulating pump. When configured in this way the master boiler control recognizes this configuration and can energize this output when appropriate based on additional settings. Those options we have put in for the Evergreen are: Always on—the output is always on when the system is powered; Externally Switched—the output is on whenever the corresponding input is switched on; Outdoor Below Warm Weather Shutdown—the output is on whenever the outdoor temperature drops below the warm weather shutdown temperature setting.

On any thermostat input—the output is on whenever there is a call for heat from any thermostat input; Any thermostat input based on its priority settings—the output is on whenever the master control is actively running the boiler network on a priority for which the output is assigned to operate; and Any burner demand—the output is on whenever the master control requires any of the appliances to operate their burner.

Manual Test Mode Operation for Multiple Appliance System—this features allows the master control to temporarily modify the operation of the multiple boiler network in order for setup and diagnostic purposes. This is an important feature due to the fact that in order to test an individual boiler (such as high fire or low fire combustion testing) the system needs to be put in a condition where all the inputs and outputs are in the appropriate condition to allow safe operation. Our system allows a selection of this option which temporarily suspends normal operation of the Network sequencing and allows the individual boilers to be tested.

User Interface for Network of Appliances—have one user interface that displays the status of all the appliances on the network including their current status, modulation rate, outlet temperature, and rotation order. Also another screen listing all the inputs available on the network, what they are configured as, and their current status. The Evergreen boiler has a two different screens where all of this information can be seen making it easy to understand if the boiler network was configured properly and what the current status is of the networks inputs and outputs.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A control system for an appliance comprising:
   a controller;
   a first circuit for using hot-water provided by the appliance;
   a first pump configured to pump hot-water provided by the appliance through the first circuit;
   a first valve configured to selectively provide hot water to the first circuit;
   a first sensor configured to send a signal to the controller associated with a demand for hot water in the first circuit;
   a second circuit for using hot water provided by the appliance;
   a second pump configured to pump hot-water provided by the appliance through the second circuit;
   a second valve configured to selectively provide hot water to the second circuit;
   a second sensor configured to send a signal to the controller associated with a demand for hot-water in the second circuit;
   a first boiler having a first boiler input signal and a first boiler output signal;
   a second boiler having a second boiler input signal and a second boiler output signal;
   a communication system configured to operatively connect the controller to the first pump, the first valve, the first sensor, the second pump, the second valve, the second sensor, the first boiler input signal, the first boiler output signal, second boiler input signal, the second boiler output signal,
   wherein the controller is configured to assign a respective priority type for each of the first and second sensor, the respective priority type being associated with a temperature and action, the controller being configured to determine if both the first and second sensor requesting hot-water are requesting the same priority type, the controller controlling one or more of the first boiler and the second boiler to provide hot water for the same priority type in response to the first and second sensor requesting hot water at the same priority type; and
   wherein the controller is configured to determine a sequence of the first boiler and the second boiler to control satisfy each priority type requested in response to the first and second sensor requesting hot-water at different priority types.

2. The control system of claim 1, further comprising a burner element associated with the appliance operatively connected to the controller and configured to be controlled by the controller for providing hot water at either the first or second temperature.

3. The control system of claim 1, wherein the controller operates the first circuit and the second circuit under a zone control regime.

4. The control system of claim 1, wherein the controller operates the first circuit and the second circuit under a priority control regime.

5. The control system of claim 1, further comprising an additional circuit for using hot-water provided by the appliance wherein the additional circuit includes an additional pump configured to pump hot-water provided by the appliance through the additional circuit; an additional valve configured to selectively provide hot water to the additional circuit; and an additional sensor configured to send a signal to the controller associated with the demand for hot water and the additional circuit.

6. The control system of claim 1, wherein the appliance is configured to provide hot water at least three different temperatures.

7. The control system of claim 1, wherein the controller is programmable to allow a user to set the hot water temperatures the appliance can provide.

8. The control system of claim 1, wherein the controller is configured to operate the valve assemblies and the pump to provide a desired water flow.

9. The control system of claim 1, wherein the controller is configured to control the first and second boiler based on different load requirements for each priority type, each associated reaction time, and prevent exceeding an associated upper temperature limit.

10. The control system of claim 1, wherein the controller is configured to average a plurality of outlet sensor temperatures in response to a failure of another outlet temperature sensor.

11. The control system of claim 1, wherein the controller is configured to poll the communication system for a working outside air temperature sensor in response to a failure of a first outside air temperature sensor.

* * * * *